US012575990B2

(12) United States Patent
Drake et al.

(10) Patent No.: US 12,575,990 B2
(45) Date of Patent: Mar. 17, 2026

(54) SYSTEM FOR PRONE POSITIONING OF SURGICAL PATIENTS

(71) Applicant: KYRA MEDICAL, INC, Northborough, MA (US)

(72) Inventors: Jesse Drake, Westborough, MA (US); Jeremy Macpherson, Medfield, MA (US); Justin Mccarthy, Boxborough, MA (US)

(73) Assignee: KYRA MEDICAL, INC, Northborough, MA (US)

(*) Notice: Subject to any disclaimer, the term of this patent is extended or adjusted under 35 U.S.C. 154(b) by 695 days.

(21) Appl. No.: 17/726,138

(22) Filed: Apr. 21, 2022

(65) Prior Publication Data

US 2022/0339051 A1 Oct. 27, 2022

Related U.S. Application Data

(60) Provisional application No. 63/258,241, filed on Apr. 21, 2021.

(51) Int. Cl.

*A61G 13/10* (2006.01)
*A61G 13/12* (2006.01)
*A61G 7/002* (2006.01)

(52) U.S. Cl.

CPC ....... *A61G 13/101* (2013.01); *A61G 13/1285* (2013.01); *A61G 7/002* (2013.01); *A61G 2200/325* (2013.01)

(58) Field of Classification Search

CPC .. A61G 31/10; A61G 13/101; A61G 13/1285; A61G 7/002; A61G 2200/325;

(Continued)

(56) References Cited

U.S. PATENT DOCUMENTS 2,152,734 A * 4/1939 Ford ........................ A61G 7/00 5/630
2,764,150 A * 9/1956 Ettinger ............ A61G 13/0054 5/630

(Continued)

FOREIGN PATENT DOCUMENTS

DE 202013100213 U1 3/2013
EP 2185031 A1 5/2010

(Continued)

OTHER PUBLICATIONS

International Preliminary Report on Patentability/Written Opinion of the International Searching Authority, PCT/US2022/025759, dated Oct. 24, 2023.

(Continued)

*Primary Examiner* — Fredrick C Conley

(74) *Attorney, Agent, or Firm* — Potomac Law Group, PLLC; John (Jack) Penny

(57) ABSTRACT

A patient support system for supporting a patient during surgery comprising support frame, a plurality of patient supports, a moveable carriage mounted to the support frame, the moveable carriage being movable along a first direction and a second direction relative to the support frame, the moveable carriage comprising mount blocks on which the patient supports are mounted, and an actuation mechanism that causes movement of the moveable carriage in the first and second directions, the patient supports being removably attached at one end to the support frame and attached at another end to the movable carriage, wherein the mount blocks are rotatable independent of any movement of the movable carriage in the first and second directions.

22 Claims, 30 Drawing Sheets

(58) Field of Classification Search
CPC .............. A61G 13/122; A61G 13/0036; A61G 13/0054
See application file for complete search history.

(56) References Cited

U.S. PATENT DOCUMENTS

| | | | | | |
|---|---|---|---|---|---|
| 4,406,043 | A * | 9/1983 | Friedman | A44B 11/006 24/182 |
| 4,729,138 | A * | 3/1988 | Heyman | A61G 7/05 248/231.71 |
| 4,823,776 | A * | 4/1989 | Foster | A61G 7/072 5/643 |
| 5,239,716 | A * | 8/1993 | Fisk | A61B 6/548 5/601 |
| 5,584,302 | A * | 12/1996 | Sillaway | A61G 13/0054 5/630 |
| 6,076,525 | A * | 6/2000 | Hoffman | A61G 13/0054 128/845 |
| 6,941,951 | B2 | 9/2005 | Hubert et al. | |
| 7,962,982 | B1 * | 6/2011 | Fellrath | A47C 21/08 5/624 |
| 8,234,730 | B2 | 8/2012 | Skripps | |
| 8,875,328 | B1 * | 11/2014 | Atkinson | A61G 13/121 5/621 |
| 9,408,767 | B2 * | 8/2016 | Atalay | A61G 13/0036 |
| 2006/0242765 | A1 * | 11/2006 | Skripps | A61G 13/04 5/624 |
| 2011/0119829 | A1 | 5/2011 | Skripps et al. | |
| 2015/0265483 | A1 | 9/2015 | Atalay et al. | |
| 2018/0353360 | A1 | 12/2018 | Kea et al. | |
| 2021/0154075 | A1 * | 5/2021 | Tu | A61G 13/02 |

FOREIGN PATENT DOCUMENTS

| | | | |
|---|---|---|---|
| JP | 3113809 | U | 9/2005 |
| JP | 2010536535 | A | 12/2010 |
| JP | 2015508320 | A | 3/2015 |
| WO | 2009029524 | A1 | 3/2009 |
| WO | 2014076546 | A1 | 5/2014 |

OTHER PUBLICATIONS

International Invitation to Pay Additional Fees and Partial Search Report, PCT/US2022/025759, dated Jul. 25, 2022, 10 pages.

International Search Report and Written Opinion, PCT/US2022/025759, dated Sep. 15, 2022, 17 pages.

Office Action (Notice of Reasons for Refusal) mailed Nov. 18, 2025 for Japanese Patent Application No. 2023-565217.

Communication Under Rule 71(3) EPC dated Dec. 5, 2025 for European Patent Application No. 22722628.9.

* cited by examiner

SYSTEM FOR PRONE POSITIONING OF SURGICAL PATIENTS

RELATED APPLICATIONS

This application claims benefit under 35 U.S.C. § 119 to U.S. Provisional Application No. 63/258,241 filed on Apr. 21, 2021.

TECHNICAL FIELD

The present disclosure relates generally to patient positioning devices that can removably attach to surgical tables for support of prone positioning of a patient during surgery. More particularly, the present disclosure relates to surgical accessories or surgical accessory frames that are configured to provide optimal prone positioning during spinal or back surgery for a variety of patient torso widths.

BACKGROUND

During many surgical procedures, such as orthopedic procedures and in particular spinal surgeries, fluoroscope images are employed to guide the implantation of orthopedic appliances, such as rods, screws and pins or the replacement/removal of discs near the spinal cord or other nerves.

It is necessary during these procedures, which require prone positioning, for the patient's abdomen or belly to hang downward without obstruction. For example, the patient's abdomen or belly cannot be supported by an underlying table structure. This ensures that minimal pressure is put on the patient's vena-inferior cava artery which might result in increased bleeding during the procedure. It is also important to safeguard against infection since mortality and morbidity are known complications of infections acquired during spinal procedures. Additionally, when the patient is in the supported prone position on the support surfaces it is important to protect the patient's skin from shear forces or friction that can lead to damage or ulceration.

Prone positioning is an important consideration during back surgery. Devices in the current art are designed to provide support to the patient's anterior torso during prone positioning and to allow the patient's abdomen to hang free and unsupported. The support provided by these devices may include pads mounted on two flexible and generally parallel leaves that are generally as long as the patient's torso. Some examples of spinal frames on the market include the Wilson™ Radiolucent Frame manufactured and distributed by Mizuho/OSI and the Allen® Bow® Frame manufactured and distributed by Hillrom.

In such conventional devices, the parallel leaves are mounted onto a generally rectilinear support frame. In the current art, a support frame is removably secured to a surgical table, using hook and loop straps (including VELCRO® brand straps), that are looped around the accessory side rails found on most operating tables.

Hook and loop straps by their nature are difficult to clean and also attract and hold debris, which may include disease spreading pathogens and pose a danger to surgical patients. Additionally, in the current art, the proximal means of actuating motion of the support structures is attached to carriages to which the support structures are mounted. Thus, when the carriages, to which the proximal end of the support structures are mounted, are rotated (moving the distal end of the leave into a vertical direction) for placement of disposables, the means of actuation are rotated downward toward the frame making it difficult for the user to access the actuation feature and causing a pinch hazard for the user.

SUMMARY

The present disclosure comprises one or more of the features recited in the appended claims and or the following features which, alone or in combination, may comprise patentable subject matter.

One aim of at least one embodiment of the present disclosure is to provide a prone positioning system that is easier to clean and disinfect thereby improving infection control tasks, which are critical to patient safety during and after a surgical procedure. An additional aim of at least one embodiment of the present disclosure is to remove pinch hazards from these systems, which may occur when rotating the support structures, while allowing for easy access to the means of actuation.

In accordance with at least one embodiment of the present disclosure there is provided a patient support system for supporting a patient during surgery comprising a support frame; a plurality of patient supports; a moveable carriage mounted to the support frame, the moveable carriage being movable along a first direction and a second direction relative to the support frame, the moveable carriage comprising mount blocks on which the patient supports are mounted; and an actuation mechanism that causes movement of the moveable carriage in the first and second directions, the patient supports removably attached at one end to the support frame and attached at another end to the movable carriage, wherein the mount blocks are rotatable independent of any movement of the movable carriage in the first and second directions.

In accordance with another embodiment of the present disclosure, the moveable carriage comprises a support rod, the mount blocks being movable along the support rod to adjust a distance between the patient supports.

In accordance with another embodiment of the present disclosure, the support rod has splines covering less than fifty percent of a circumferential surface of said splined support rod.

In accordance with another embodiment of the present disclosure, the support rod is mounted to the actuation mechanism.

In accordance with another embodiment of the present disclosure, the mount blocks are rotationally supported on the support rod, and the moveable carriage further comprises actuation mounts corresponding to each of the mount blocks and supported on the support rod, wherein when a mount block is rotated relative to the support rod, the actuation mounts do not rotate relative to the support rod.

In accordance with another embodiment of the present disclosure, each of the actuation mounts comprise an actuation button assembly and an actuation button, wherein when a mount block is rotated relative to the support rod by actuating the actuation button, the actuation button assembly and actuation button do not rotate relative to support rod and relative to frame.

In accordance with another embodiment of the present disclosure, the frame has a cutout in a center portion thereof of a size equal to at least 80% of a total upper surface area of said frame.

In accordance with another embodiment of the present disclosure, the patient supports comprise a padded flexible member.

In accordance with another embodiment of the present disclosure, the frame has a handle formed into its lateral, distal and proximal sides.

In accordance with another embodiment of the present disclosure, the frame comprises channels formed into its lateral sides sized to accept accessory rails of a medical bed or surgical table.

In accordance with another embodiment of the present disclosure, the frame comprises at least one handle formed into each of its lateral sides.

In accordance with another embodiment of the present disclosure, the frame comprises at least one handle formed into each of its ends.

In accordance with another embodiment of the present disclosure, the support rod is mounted to a splined rod mount that is movable in the longitudinal direction along a drive screw by the actuation mechanism.

In accordance with another embodiment of the present disclosure, the actuation mechanism comprises a crank rod that drives the drive screw.

In accordance with another embodiment of the present disclosure, the crank rod is made of a material with radiolucent properties selected from the group comprising aluminum and carbon fiber.

In accordance with another embodiment of the present disclosure, the crank rod is configured to be driven by a crank handle.

In accordance with at least one embodiment of the present disclosure there is provided a patient support system for supporting a patient during surgery comprising a support frame; and a plurality of patient supports removably attached to the support frame, wherein the support frame is removably attachable to a surgical table by a flexible waterproof strap that passes around a surgical rail on the surgical table, wherein the strap is connected at one end to the support frame and removably attached to the support frame at its other end.

In accordance with another embodiment of the present disclosure, the waterproof band or strap has holes formed therein.

In accordance with another embodiment of the present disclosure, portions of the strap surrounding said holes have increased thickness.

Another embodiment of the present disclosure comprises at least two strap brackets each having a stand-off are mounted to an upper surface of the support frame such that the strap can be looped around a surgical table side rail and looped over and through the strap bracket and attached to stand off.

In accordance with another embodiment of the present disclosure, the holes are sized to fit the stand-off.

In accordance with at least one embodiment of the present disclosure there is provided a patient support system for supporting a patient during surgery comprising a support frame; and a plurality of patient supports, wherein the patient supports comprise leaves the leaves 105 that include a notch portion on an outside section thereof thereby allowing the leaves to extend in a width direction beyond the frame.

In accordance with another embodiment of the present disclosure, the notch portions have a dimension in the width direction of between one inch and four inches.

In accordance with another embodiment of the present disclosure, the frame is a one piece unibody frame.

In accordance with another embodiment of the present disclosure, the frame is formed from materials selected from the group comprising glass filled polycarbonate, carbon fiber, mixture of glass filled polycarbonate and carbon fiber.

In accordance with at least one embodiment of the present disclosure there is provided a strap buckle, comprising a body having two opposed sides, each side configured for engaging and supporting a strap; and two protrusions each formed on one of the opposed sides, each protrusion being configured for engaging with a hole in the strap so as to secure the strap to the respective opposed side.

In accordance with another embodiment of the present disclosure, each opposed side comprises a substantially flat surface from which the respective protrusion extends outwardly.

In accordance with another embodiment of the present disclosure, each of the protrusions is tilted relative to a respective flat surface.

In accordance with another embodiment of the present disclosure, an acute angle formed between each of the protrusions and the respective flat surface is in a range of about 39 degrees to about 89 degrees.

Another embodiment of the present disclosure comprises at least two strap holders formed on each opposite side of the body, each strap holder providing a substantially rectangular opening through which the strap can pass.

In accordance with another embodiment of the present disclosure, protrusions are curve-shaped and extend away from a respective flat surface of the opposed sides in a curve having a radius of curvature in a range of approximately 10 mm to 100 mm.

In accordance with another embodiment of the present disclosure, the protrusions are configured to extend away from a respective flat surface of the opposed sides to a height greater than a height of the strap holders.

Another embodiment of the present disclosure comprises cutouts formed in the opposed sides in areas opposite to the strap holders.

Other aspects of the advantages of this disclosure and advantages of this invention can become apparent from following the drawings and description, all of which illustrates the various aspects of the invention, by way of example only.

DETAILED DESCRIPTION

The present disclosure is for a patient support and positioning apparatus and related methods. Patients undergoing back or spinal surgery many times must be placed in the prone position. This disclosure relates to a spinal positioning system that allows prone positioning of the patient and for the adjustment of the patient's spine or back for spinal surgical procedures such as correction of spinal deformities or injuries such as scoliosis, kyphosis disc removal and/or fusion or disc replacement. The disclosure allows for an attachment to a surgical table of the apparatus with the apparatus being easier to clean while eliminating pinch hazards providing ease of use features.

Figure 1:
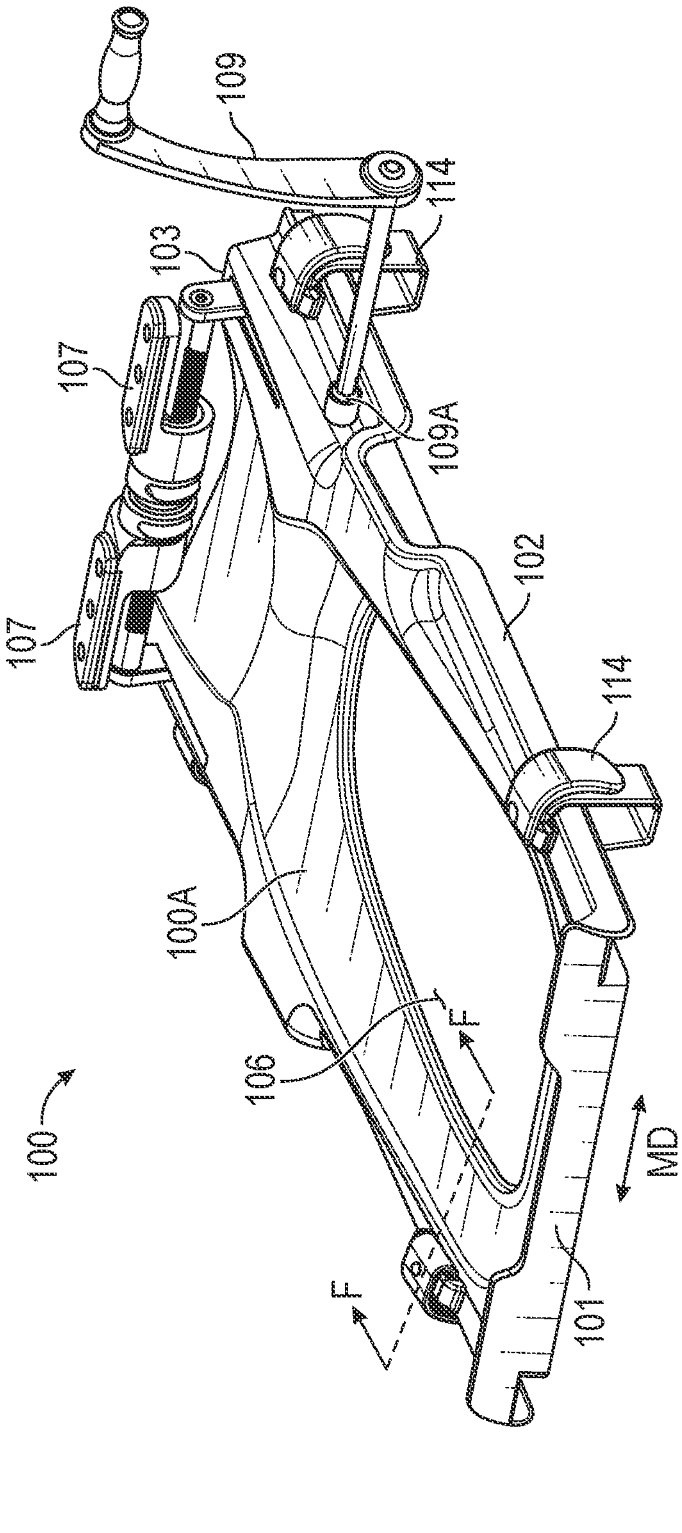
FIG. 1 illustrates a perspective view of an embodiment of the positioning system without the flexible leaves installed.
Figure 2:
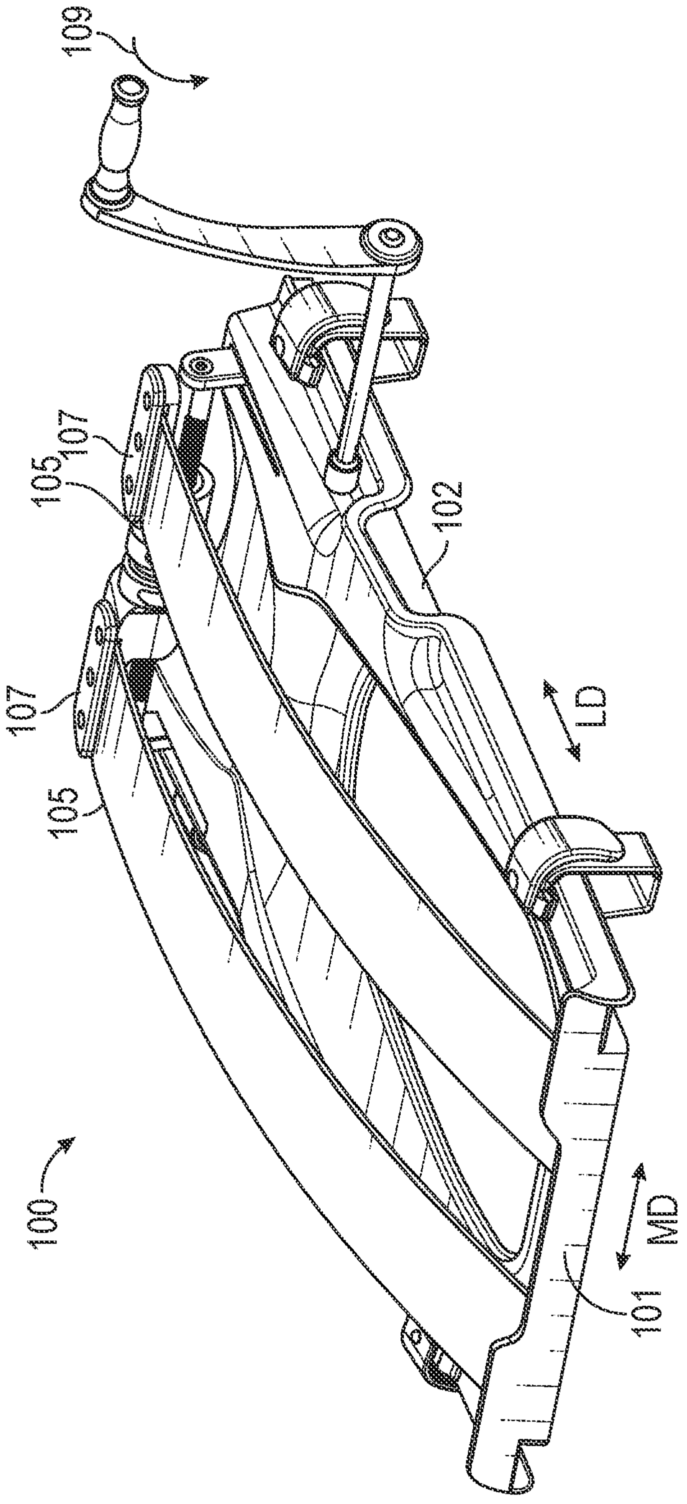
FIG. 2 illustrates a perspective view of an embodiment of the positioning system with the flexible leaves installed.
Figure 3:
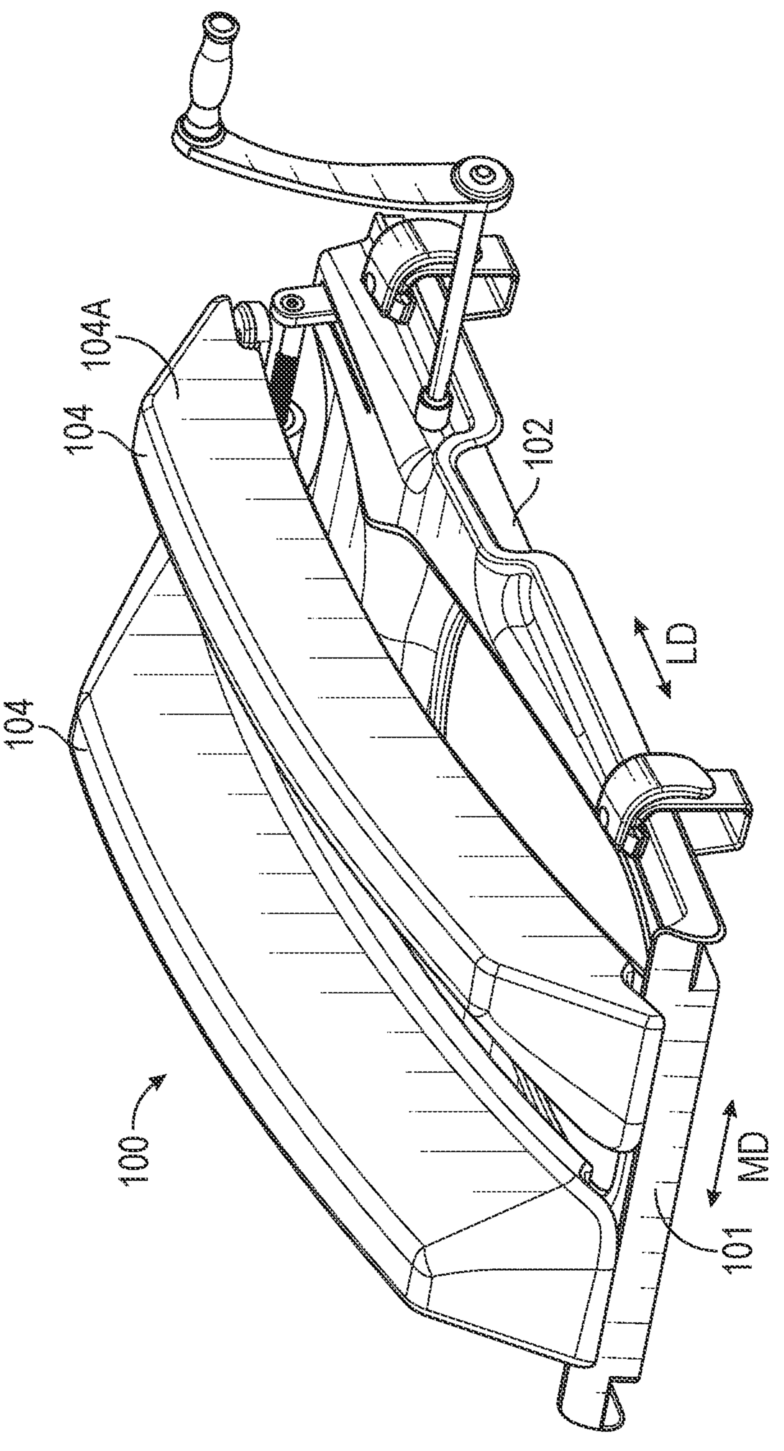
FIG. 3 illustrates a perspective view of an embodiment of the positioning system with the flexible leaves installed and padding installed on the flexible leaves.

FIG. 1 and FIG. 2 illustrate aspects of an embodiment of a prone positioning system for spinal surgery hereafter referred to as positioning system 100. Positioning system 100 includes support frame 100A. The system allows for adjusting the width of support portions 104 in the medial and lateral direction noted by arrow MD as shown in FIG. 3 by moving the mount blocks 107 along the rod 120 (see FIG. 1 and FIG. 16). Motion in direction MD of FIG. 3 of the patient support portions 104 allows the user to adjust system 100 to a variety of patient torso widths. The system also allows for movement of the leaves 105 of FIG. 2 in distal and proximal directions noted by LD. Since the distal ends of leaves of 105 of FIG. 2 are fixed when they are moved in direction LD leaves 105 will bow upwards or downwards allowing the patient's spine/back to be flexed into optimal positions for spinal surgery.

FIG. 1, FIG. 2 and FIG. 3 illustrate some aspects of at least one embodiment of positioning system 100 which generally comprises frame 100A with lateral sides 102 and frame cut out 106, distal end 101 and includes patient supports 104 of FIG. 3. Patient supports 104 of FIG. 3 may comprise flexible leaves 105 of FIG. 2 covered by padding 104A. In at least some embodiments, support frame 100A can be made as one piece as a unibody frame, which can be formed from materials such as glass filled polycarbonate, carbon fiber, or a mixture of glass filled polycarbonate and carbon fiber or other suitable materials.

As shown in FIG. 1 the positioning system may further include mount block 107 (a pair illustrated in the example), frame 100A with distal end 101, proximal end 103, sides 102 and frame cut out 106. Removable crank handle 109 may be fitted into crank housing 109A and attached to crank rod (not shown). Positioning system 100, in this illustration and embodiment, is shown without the flexible leaves installed. Attachment straps 114 secure the system to side rails (not shown) of the surgical table (not shown).

Figure 11:
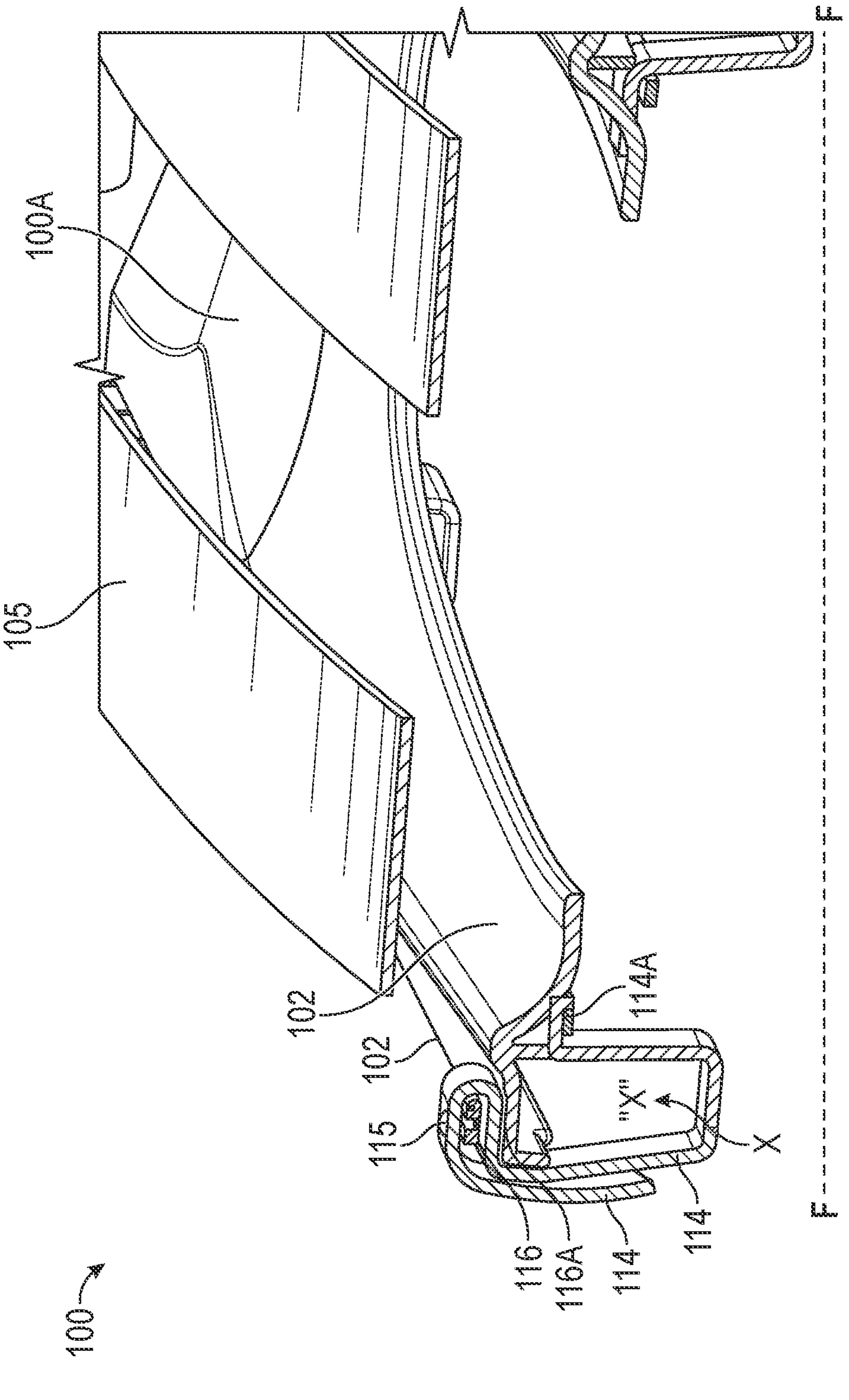
FIG. 11 illustrates a perspective view of section F-F of an embodiment of the positioning system of FIG. 1.

FIG. 2 is another illustration of a perspective view of an embodiment of positioning system 100 with leaves 105 installed. In this embodiment, each of the leaves 105 are fixedly attached at its proximal end to a respective mount block 107. The distal end of each of the leaves 105 is removably received into a slot (not shown in FIG. 2) provided in distal end 101 of frame 100A. The slot can be formed so that distal end of the leaf 105 with notch 105A fits securely into said slot, as described below with respect to FIG. 13A and FIG. 5B. The positioning system further includes a rotatable, removable crank 109, which when rotated in direction Q, actuates motion of mount blocks 107 in direction LD causing flexible leaves 105 to flex or bow. Some aspects of section view F-F (see FIG. 1) is illustrated in FIG. 11.

FIG. 3 illustrates a perspective view of an embodiment of positioning system 100 showing patient supports 104 installed. Patient supports 104 comprise leaves (not shown) covered by padding 104A. Patient supports 104 can be adjusted in direction shown by arrows MD and LD.

Figure 4:
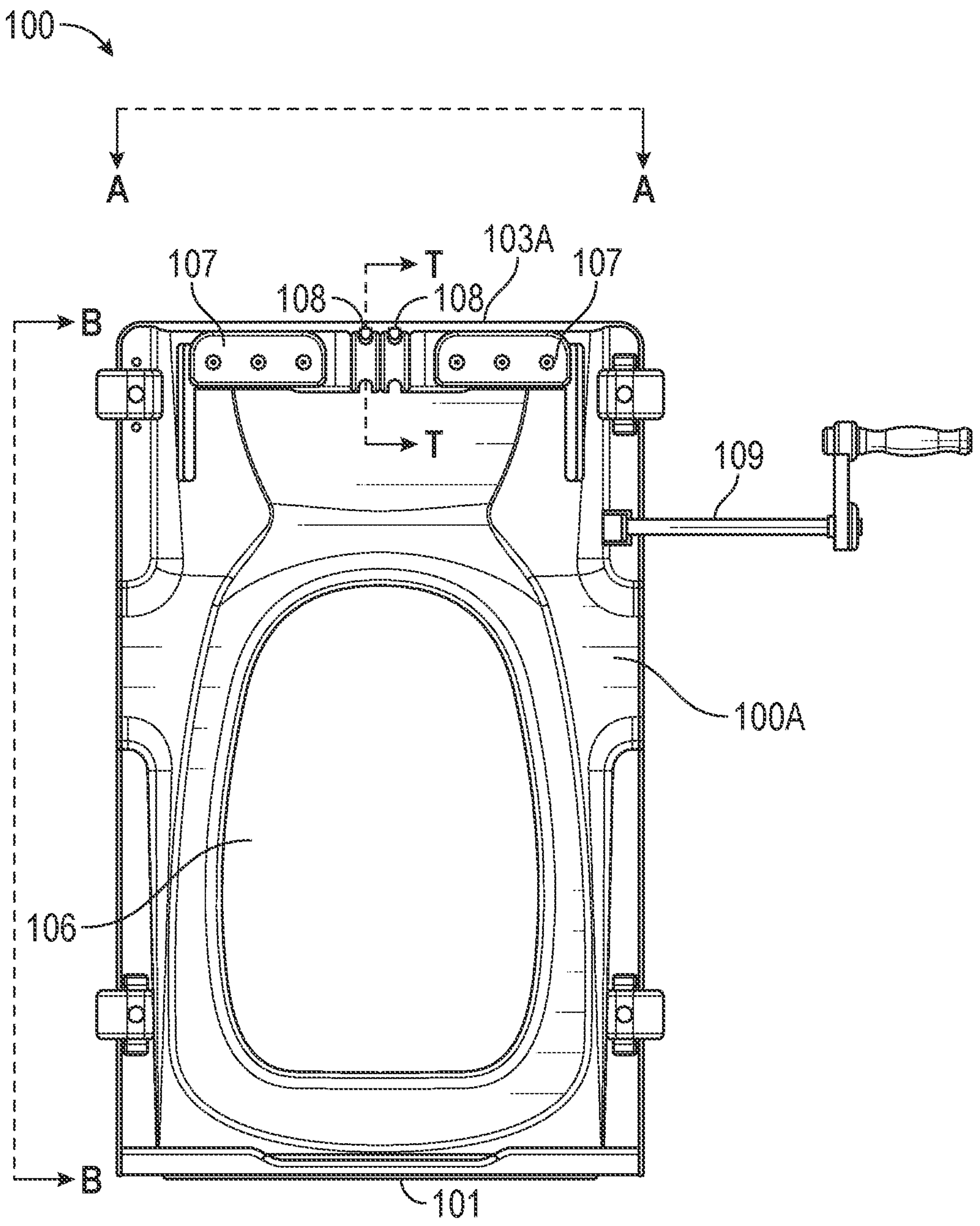
FIG. 4 illustrates a top plan view of an embodiment of the positioning system without the flexible leaves installed.
Figure 6:
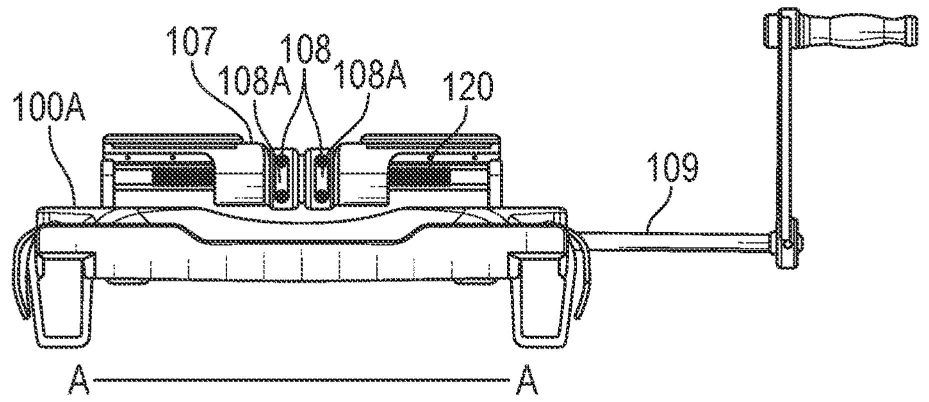
FIG. 6 illustrates a of section A-A of FIG. 4 of an embodiment of the positioning system without the flexible leaves installed.
Figure 7:
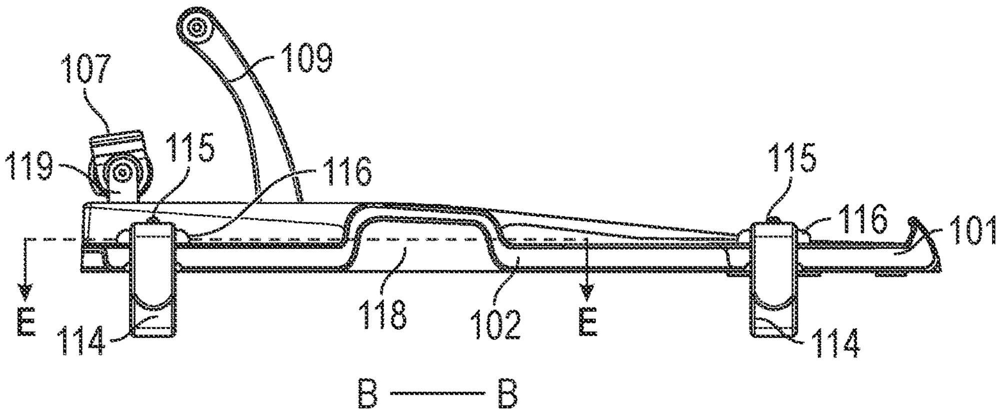
FIG. 7 shows a view of section B-B of FIG. 4 of an embodiment of the positioning system without flexible leaves installed.

FIG. 4 illustrates a top plan view of an embodiment of positioning system 100 without leaves installed. Frame 100A has sides 102, distal end 101 and proximal end 103 with frame cut out 106. Mount block 107 (illustrated as pair) has actuation mount 108 attached to it. Certain aspects of section A-A of FIG. 4 are illustrated in FIG. 6. Certain aspects of section B-B of FIG. 4 are illustrated in FIG. 7.

Figure 5A:
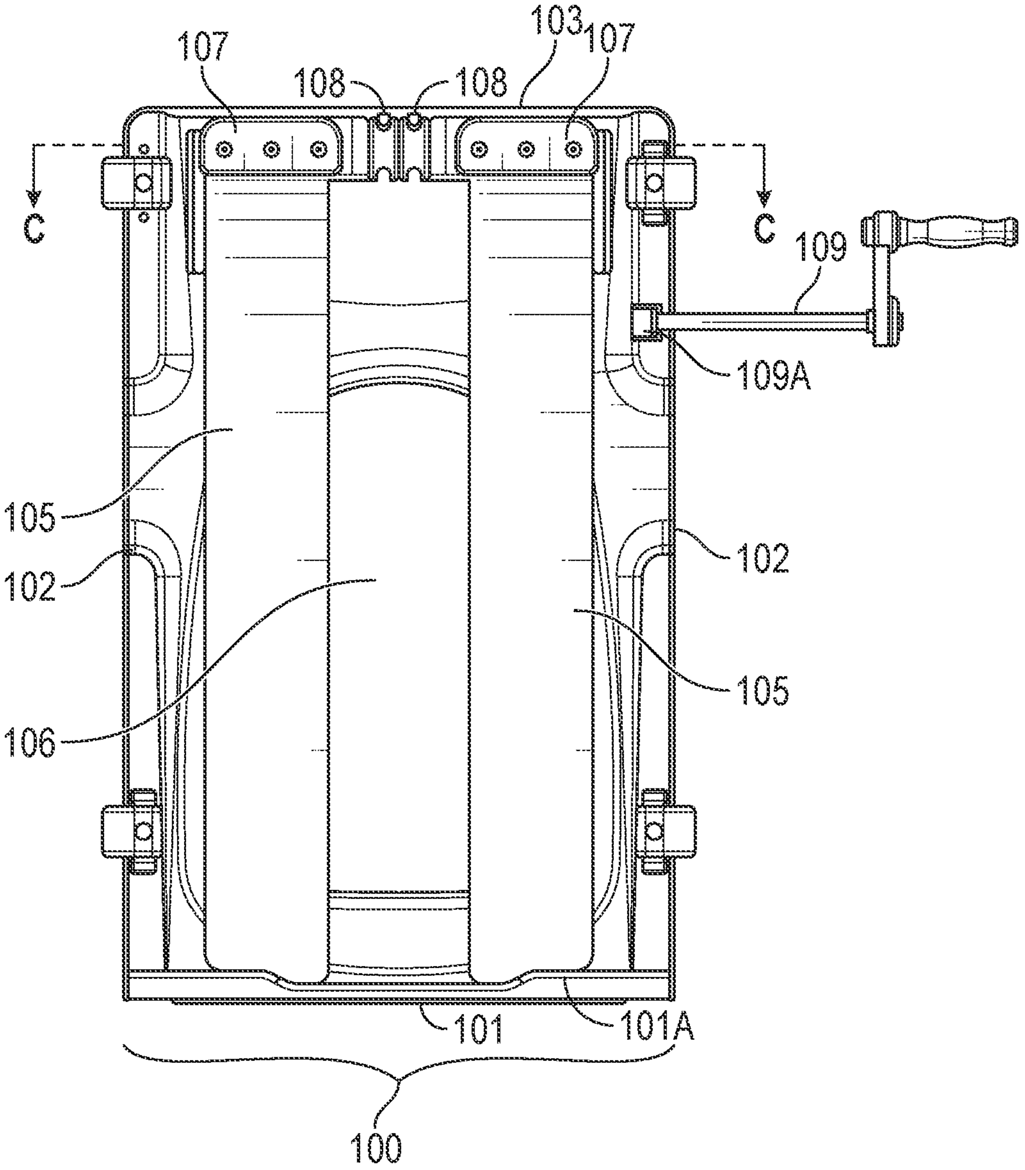
FIG. 5A and FIG. 5B illustrate top views of an embodiment of the positioning system with the flexible leaves installed.
Figure 5B:
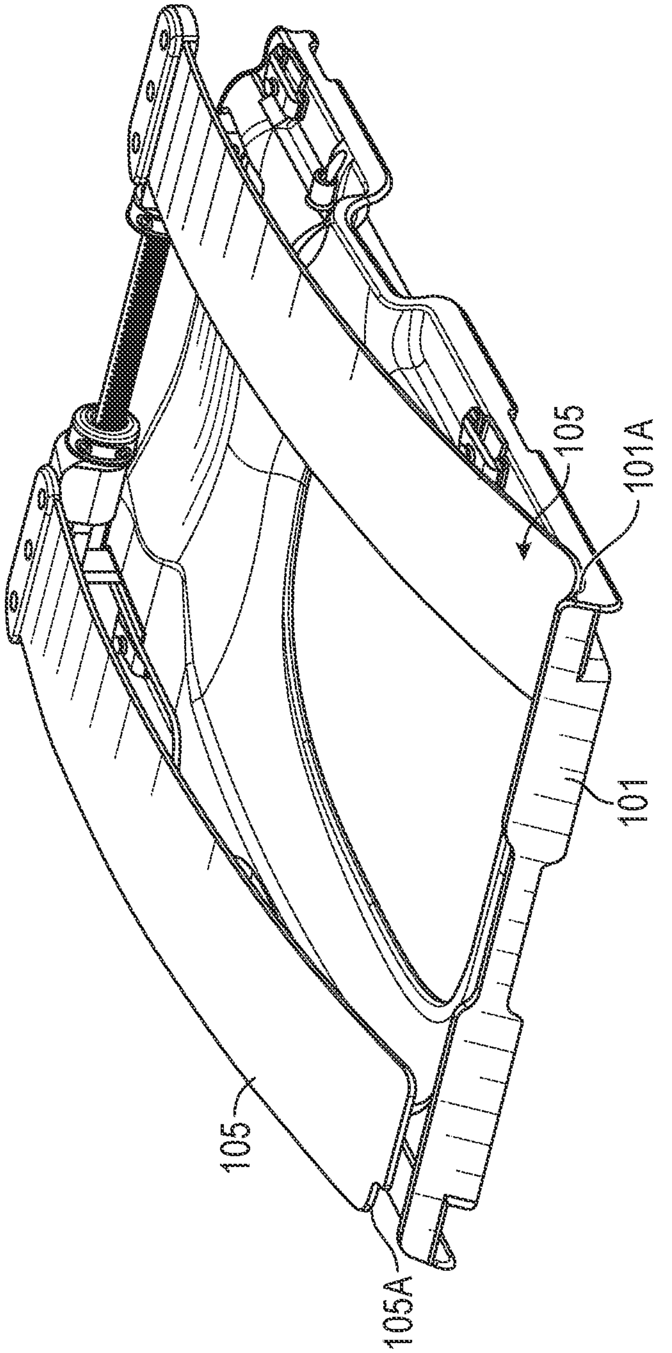
Figure 8:
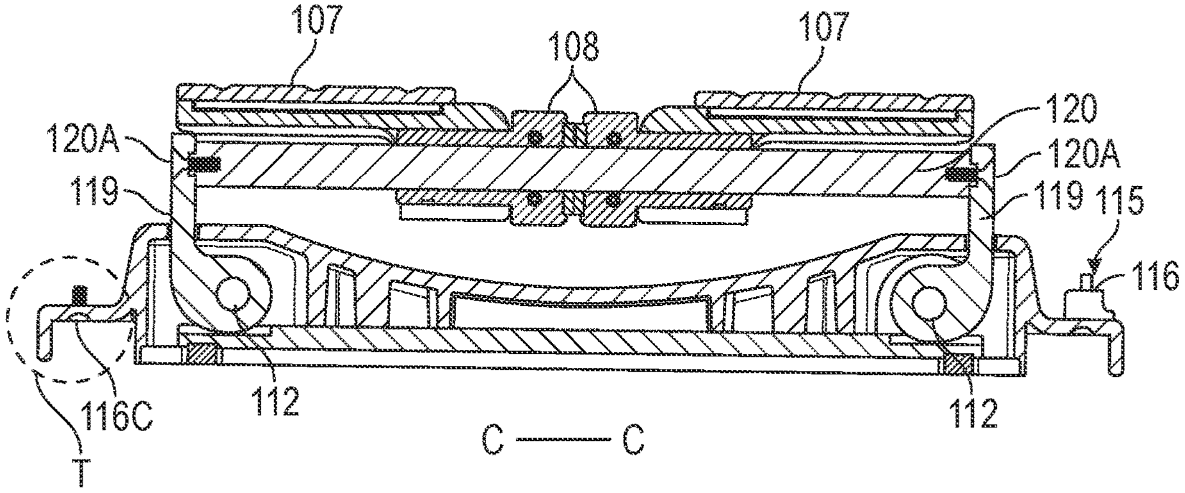
FIG. 8 illustrates a view of section C-C of an embodiment of the positioning system of FIG. 5.

FIG. 5A illustrates a top plan view of an embodiment of positioning system 100 having frame 100A with cut-out 106 and leaves 105 installed. Removable crank handle 109 with crank housing 109A is also shown. Leaves 105 are fitted into mount block 107 (pair illustrated) and removably attached at proximal end 103 and into slots 101A of distal end 101 of frame 100A. Mount block 107 has actuation mount 108 attached to it. Certain aspects of section C-C of FIG. 5 are illustrated in FIG. 8. As shown in FIG. 5B the leaves 105 can include Notch Portion 105 formed on an outside portion thereof. The Notch Portion 105A makes it possible to allow the leaves to extend in the width direction beyond the frame 100A, thereby allowing the leaves to accommodate larger widths without increasing the width of the frame 100A.

Notch Portion 105A can have a dimension in the width direction of between one inch and four inches.

Figure 17A:
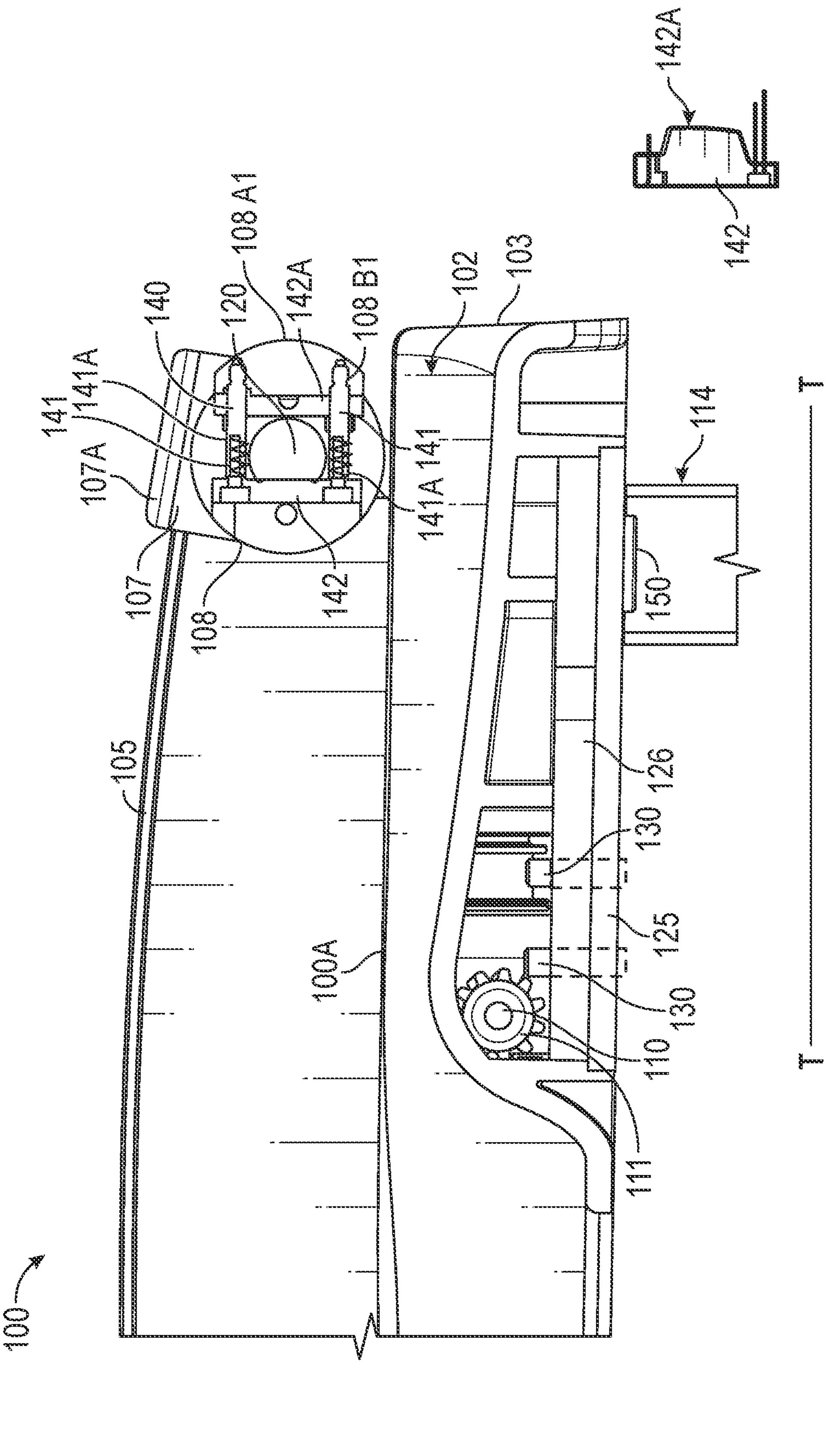
FIG. 17A illustrates a view of section T-T of FIG. 4 of an embodiment of an embodiment of the positioning system.

FIG. 6 illustrates section A-A which is a proximal end view of one aspect of FIG. 4 of an embodiment of positioning system 100 with frame 100A and removable crank handle 109. Splined support rod 120 is attached to splined rod mount 119 which in turn is attached to the upper surface of proximal end 103 of frame 100A of positioning system 100. Splined Rod 120 is passed into and positioned in through holes (not shown) in mount block 107 (a pair illustrated) and actuation mount 108 with actuation button assembly 108A prior to attachment of splined rod 120 to splined rod mount 119. Certain aspects of section A-A are illustrated in FIG. 17A.

FIG. 7 illustrates a side view B-B from FIG. 4 of an embodiment of positioning system 100 with removable crank handle 109. Handle 118 is cut or formed into side 102 of frame 100A. Strap bracket 116 (a pair illustrated in this view) is attached to the upper surface of side 102 of positioning system 100 close to both the distal end 101 and proximal end 103. Strap bracket 116 has stand-off 115 attached to its upper surface. Attachment strap 114 is looped around surgical table side rail (not shown) and then looped over and through strap bracket 116 and then attached to stand off 115. Mount bracket 107 is mounted onto splined rod (not shown) which is attached to splined rod mount 119 attached to upper surface of positioning system 100. Removable crank handle 109 is attached into side (not shown) of positioning system 100. Certain aspects of section E-E arc illustrated in FIG. 9. In at least some embodiments, the splined rod mount 119 can be made of bronze and can include a bronze nut formed therein integral with the splined rod.

FIG. 8 illustrates a cutaway section view C-C from FIG. 5 of an embodiment of positioning system 100 with frame 100A. Strap bracket 116 is mounted onto upper surface of side 102. Circle T shows side 102 without mount bracket 116 but illustrates mount bracket threaded bolt 116A that attaches mount bracket (not shown in Circle T but shown on the opposite side) to the top surface of side 102. Splined rod 120 is attached to spline rod mount 119 by threaded screw 120A. Mount block 107 is attached to actuation mount 108. Splined rod 120 is passed through the through holes (not shown) in mount block 107 and through holes (not shown) in actuation mount 108. Strap bracket 116 attaches to the upper surface of side 102 of positioning system 100. Drive screw 112 is engaged into threaded hole (not shown) of splined rod mount 119.

Figure 9:
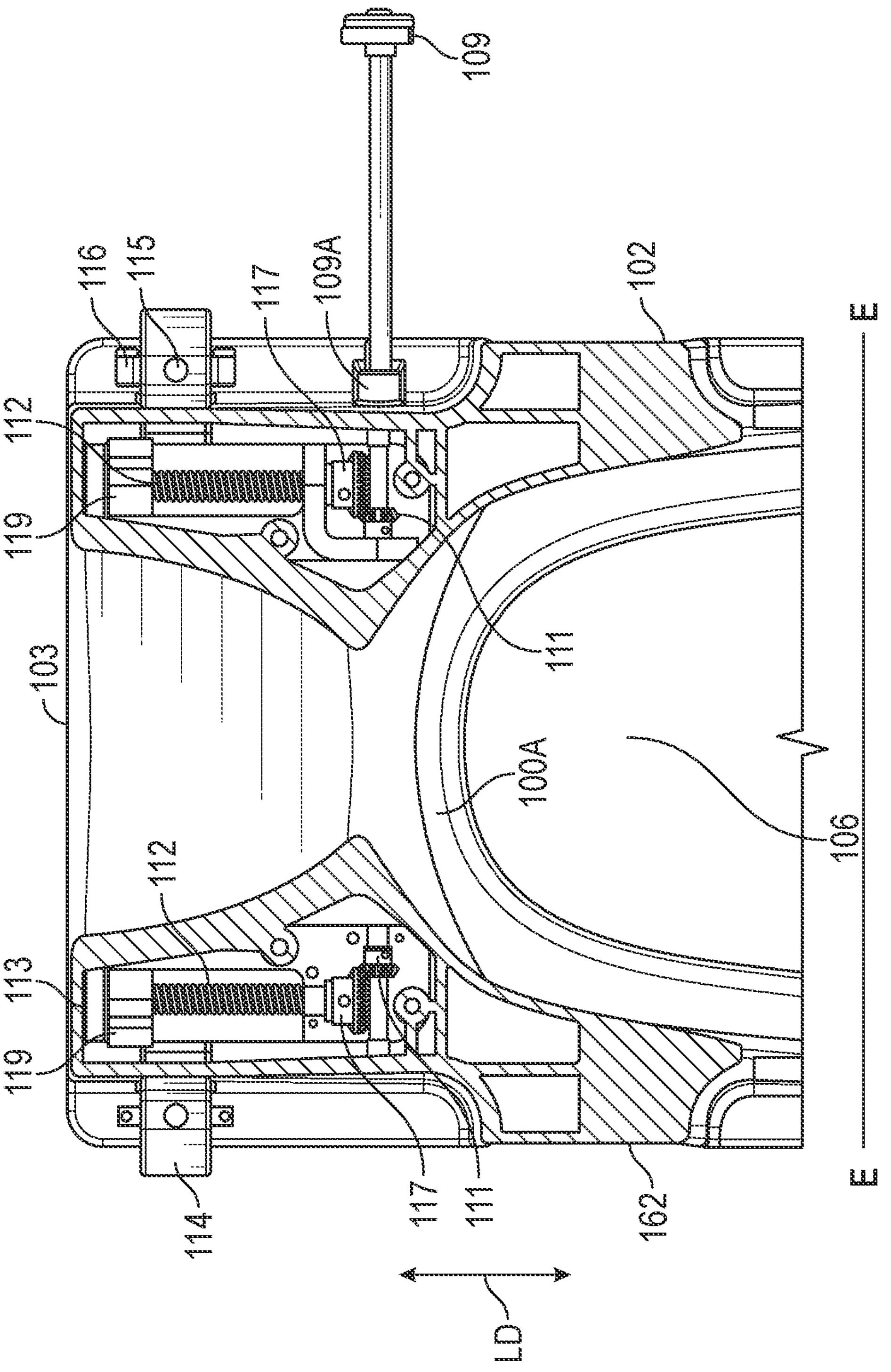
FIG. 9 illustrates a view of section E-E of an embodiment of the positioning system of FIG. 7.

FIG. 9 illustrates an aspect of section E-E from FIG. 7 of an embodiment of positioning system 100. Positioning system 100 has sides 102 and proximal end 103. Removable crank handle 109 connects with crank rod 110 (see FIG. 10) in crank housing 109A. Crank rod 110 has crank rod gears 111 which engage with screw drive gear 117 of drive screw 112. Mount bracket 113 is fixed to the upper surface of proximal end 103 of frame 100A. The non-threaded proximal end (not shown) of drive screw 112 is fixed to mount bracket 113. Drive screw 112 is threaded through and engaged with threaded hole (not shown) in splined rod mount 119. It can be seen that when the rotation of removable crank handle 109 engages with and rotates crank rod 110 then crank rod gear 111 engages with and rotates screw drive gear 117. The rotation of drive gear 117 then rotates drive screw 112. Since drive screw 112 is fixed to mount bracket 113 the rotation of drive screw 112 translates into the linear motion of spline mount 119 in direction LD, which moves the mount blocks 107 and actuation mounts 108 (see FIG. 5, FIG. 6, FIG. 7 and FIG. 8) which together form a moveable carriage. The crank rod 110 can be made of aluminum, or other materials with radiolucent properties, such as carbon fiber, etc. so as to not inhibit formation of images of anatomical structures below the crank rod.

Figure 10:
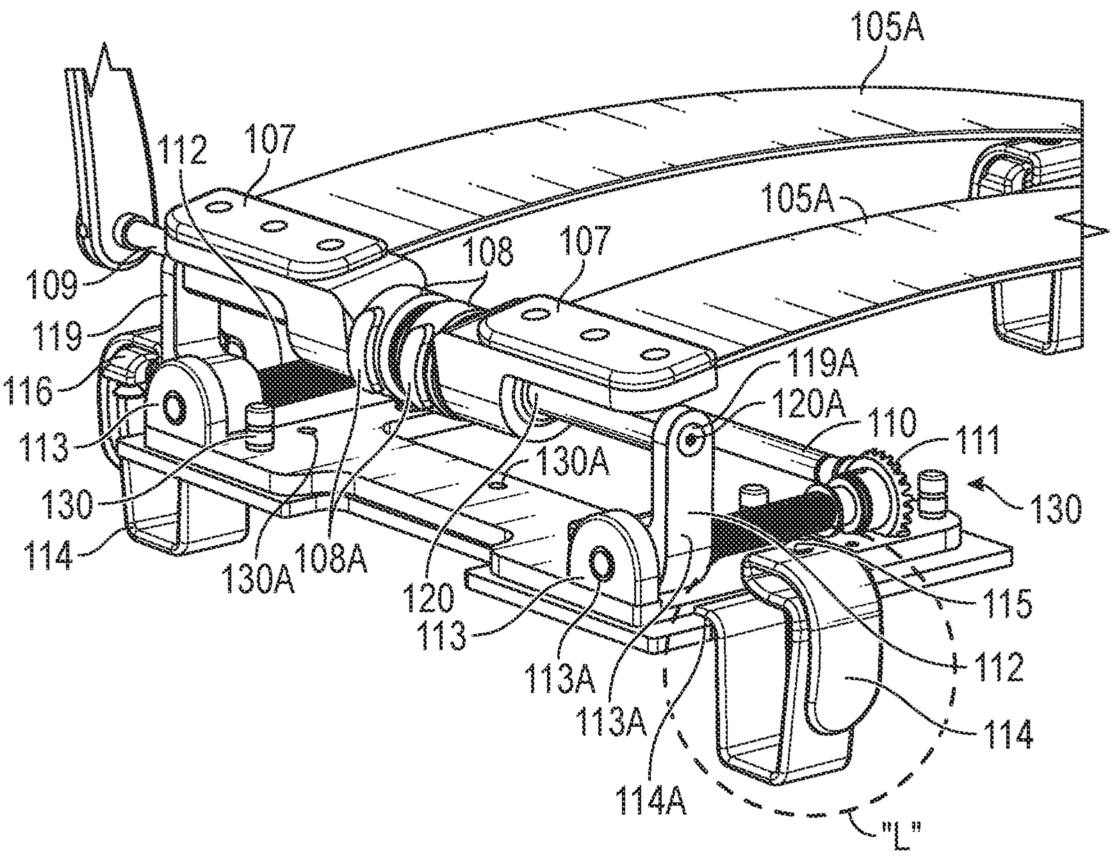
FIG. 10 illustrates a perspective view of some aspects of the distal end of an embodiment of the positioning system.

FIG. 10 illustrates a perspective view of some components of the proximal end of an embodiment of positioning system 100. For sake of clarity frame 100A is not shown. Mount bracket 116 is intentionally left out of area "L" of the illustration in order to show attachment point 114A of attachment strap 114 to lower platform 125. Lower platform 125 (see FIG. 17A) is attached to upper platform 126 (see FIG. 17A) by bolts 130, which pass through holes 130A which are formed into both platforms and aligned one to the other. Bolts 130 attach upper platform 126 and lower platform 125 to one another and also to the bottom side of the lower surface of distal positioning system 100 (not shown). Mount bracket 113 with hole 113A is attached to upper platform 126 by bolts (not shown) which pass through holes (not shown) in lower platform 125 and upper platform 126 that fit into matching holes (not shown) in the lower surface (not shown) of mount bracket 113. Non threaded proximal end (not shown) of drive screw 112 is fitted into hole 113A of mount bracket 113. Drive screw 112 is fitted into threaded hole (not shown) in splined rod mount 119. Drive screw gear 117 is mounted to the distal end of drive screw 112. Splined rod 120 is passed into through holes in mount blocks 107 and through holes in actuation mounts 108. Splined rod 120 is then mounted onto rod mount 119 by flat head screw 120A. Flexible leaves 105 are fitted into slots (not shown) in mount block 107. Removable crank handle 109 is fitted onto crank rod 110.

FIG. 11 illustrates section view F-F of FIG. 1 of some components of an embodiment of positioning system 100. Strap bracket 116 with standoff 115 is mounted to upper surface of side 102 of frame 100A of positioning system 100. Attachment strap 114 with holes (not shown) is attached onto upper surface of lower platform 125 at distal end 101 of frame 100A of positioning system 100.

Attachment strap 114 is placed under surgical table side rail (not shown but indicted by the space X) and through lateral opening 116A and looped around medial side 116B of strap bracket 116 with hole (not shown) in attachment strap 116 engaged over standoff 115 thus removably securing distal end of frame 100A to surgical table side rail (not shown but indicted by the space X).

Figure 12:
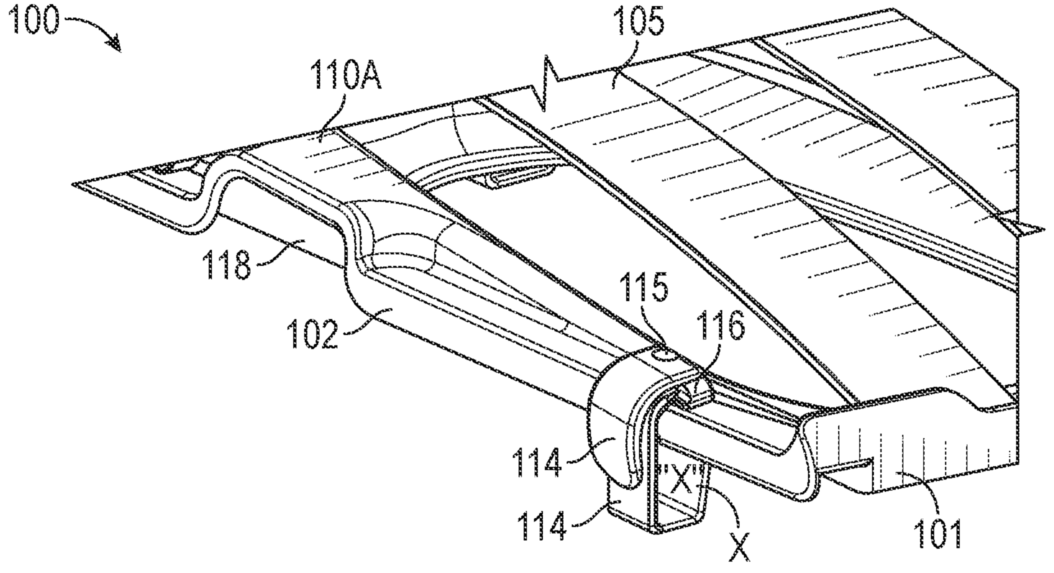
FIG. 12 illustrates a perspective view of some aspects of a portion of the distal end of an embodiment of the positioning system.

FIG. 12 shows a perspective view of some components of an embodiment of positioning system 100. Strap bracket 116 is mounted to the upper surface of lateral side 102 of frame 100A of positioning system 100 near distal end 101. Attachment strap 114 is fixed to lower surface of lower platform (not shown). Attachment strap 114 is placed under surgical table side rail (not shown but indicted by the space X) and through lateral opening 116A of strap bracket 116 and looped around medial side 116B of strap bracket 116 with hole (not shown) in attachment strap 114 engaged over standoff 115, thereby removably attaching this distal end to frame 100A. Flexible leaf 105 is fitted into slots (not shown) in distal end 101 of frame 100A. Handle 118 is formed into underside of a portion of lateral side 102 of frame 100A.

Figure 13A:
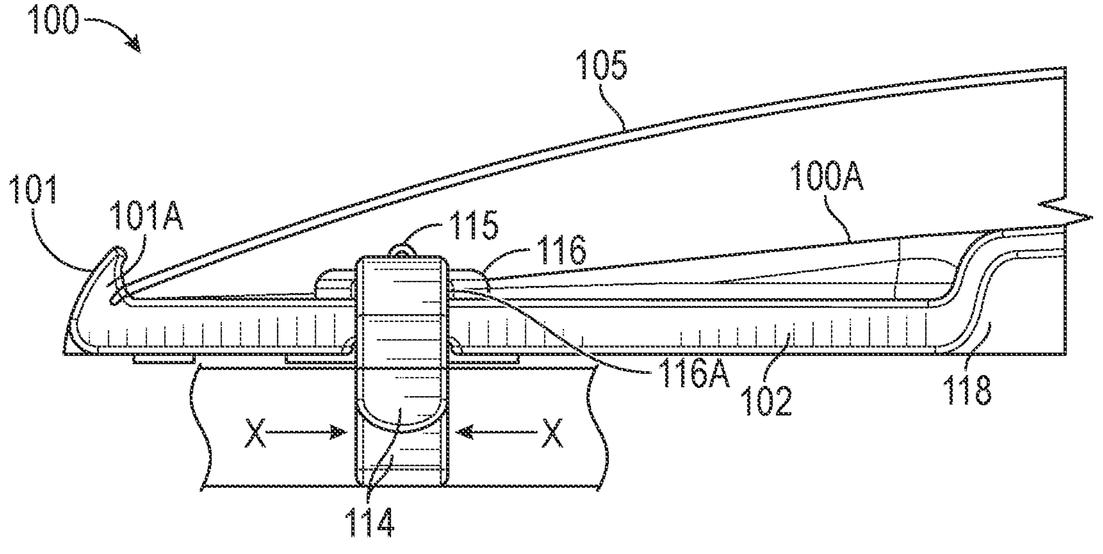
FIG. 13A illustrates a side view of some aspects of the distal portion of an embodiment of the positioning system with the flexible leaves installed.

FIG. 13A illustrates a side view of some aspects of an embodiment of positioning system 100 and frame 100A. Strap bracket 116 is attached to upper surface 102 of frame 100A which has handle 118 formed in a portion of its lower surface. Flexible leaf 105 is fitted into slot 101A of distal encl 101.

Figure 13B:
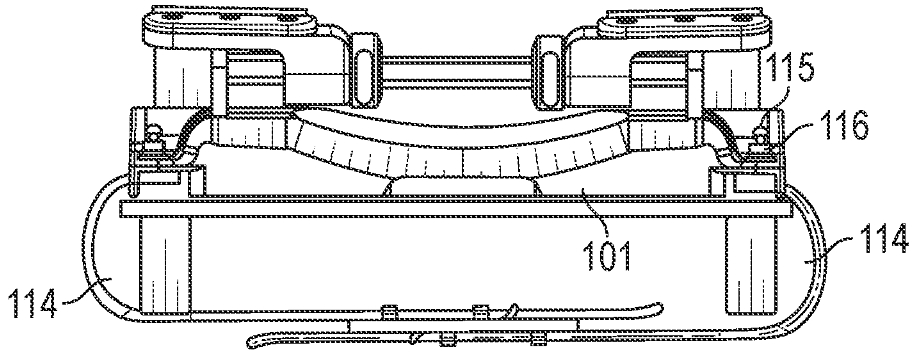
FIGS. 13B-13 D illustrate the positioning mounted to different types of tables.
Figure 13C:
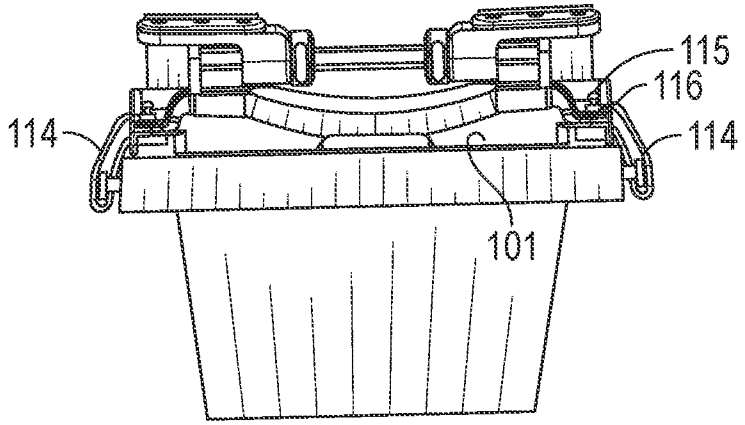
Figure 13D:
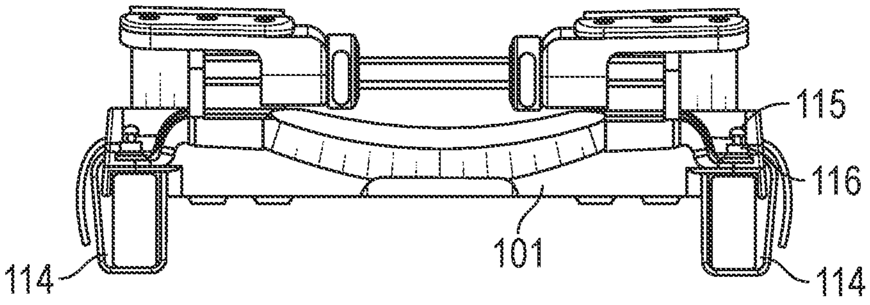

Attachment strap 114 is looped around lower surface of surgical table side rail "X-X" and passed through opening 116A and over the top of strap bracket 116 with hole (not shown) of attachment strap 114 engaged with stand-off 115 removably attaching positioning system 100 and frame 100A to surgical table (not shown) via surgical table side rail X-X. The positioning system can also be mounted to Jackson flat top table, an operating table or Jackson rails, as shown in FIGS. 13B, 13C and 13D, respectively.

Figure 14:
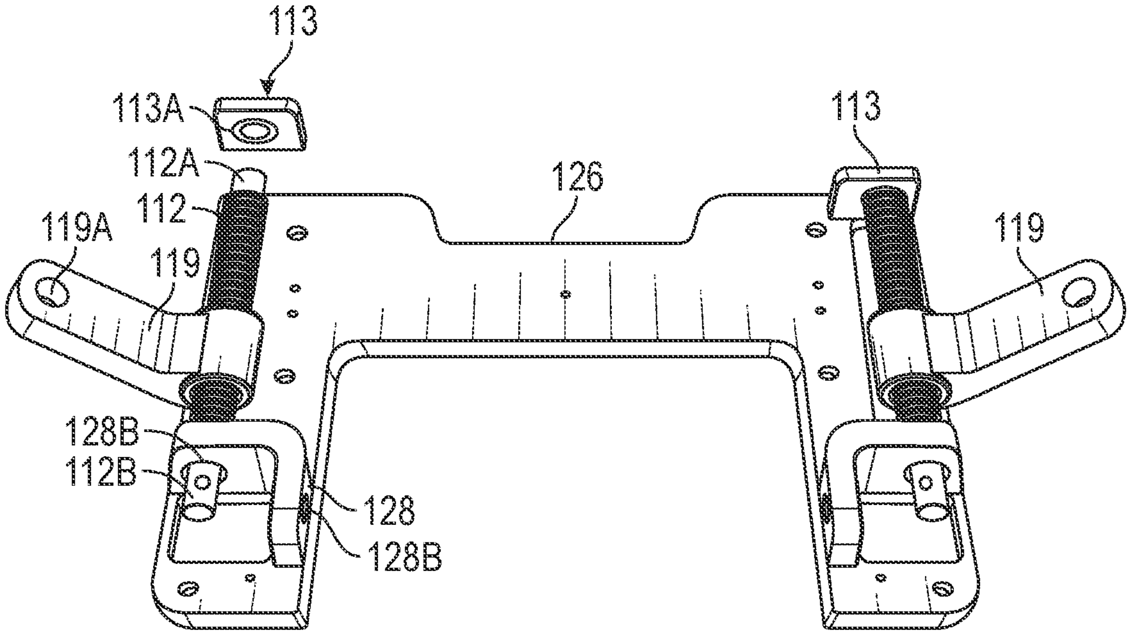
FIG. 14 illustrates a perspective view of some aspects of components of an embodiment of the positioning system.

FIG. 14 illustrates a view of some components of an embodiment of positioning system 100. Lower platform 126 has mount bracket 113 installed on its upper surface along with u-mount 128 (a pair illustrated) with holes 128B. Drive screw 112 with non-threaded end 112A is mounted into hole 113A of mount bracket 113. Splined rod mount 119 with threaded hole 119A is engaged with threads on screw drive 112 while non-threaded distal end 112B is engaged into hole 128B in u-mount 128.

Figure 15:
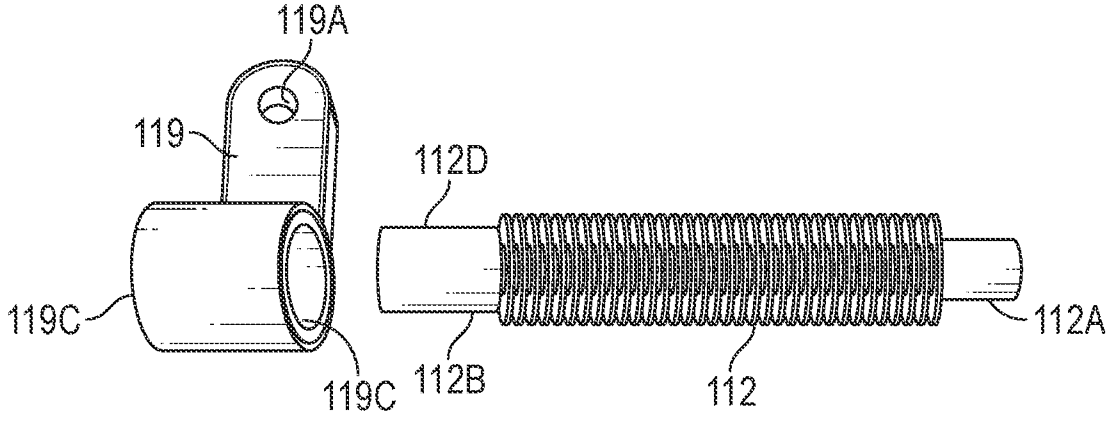
FIG. 15 illustrates a perspective view of some aspects of components of an embodiment of positioning system.

FIG. 15 illustrates a view of some components of an embodiment of positioning system 100. Drive screw 112 has a non-threaded proximal end 112A and a non-threaded distal end 112B with through hole 112D for mounting drive screw gear (not shown). Splined mount rod 119 with hole 119A and threaded hole 119C can be engaged with threads on screw drive 112.

Figure 16:
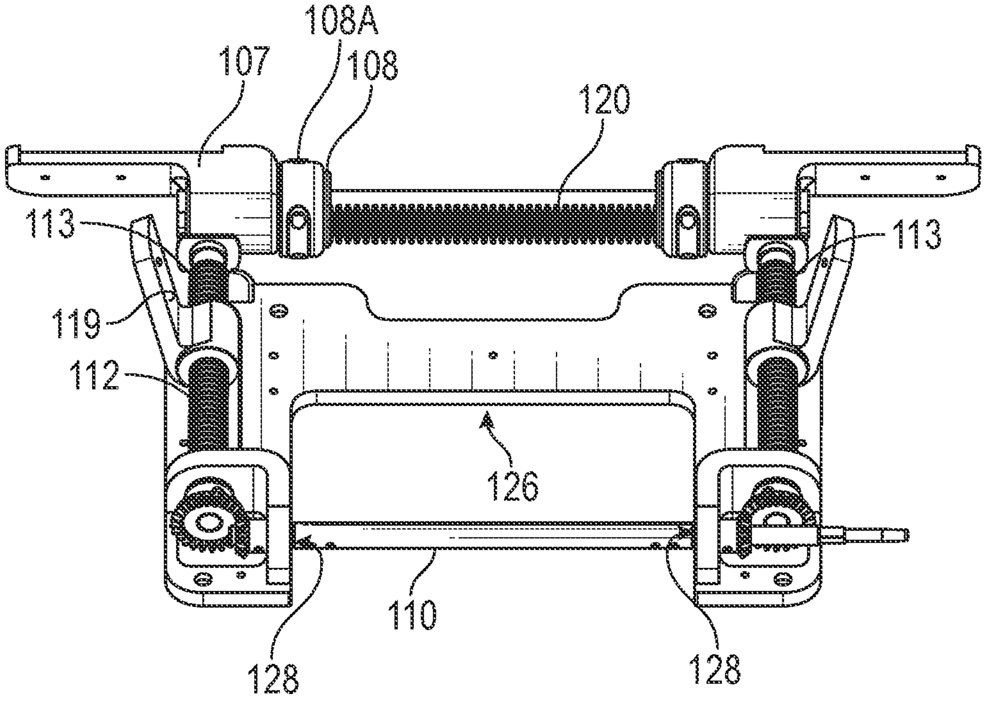
FIG. 16 illustrates a perspective view of some aspects of components of an embodiment of the positioning system.

FIG. 16 illustrates a perspective view of some assembled components of an embodiment of positioning system 100. Upper platform 126 has mount bracket 113 installed on its upper surface. Drive screw 112 is engaged into threaded hole (not shown) of splined rod mount 119. Non-threaded proximal end (not shown) of drive screw 112 is inserted into holes (not shown) in mount bracket 113. U-mount 128 is mounted to upper surface of platform 126. Non-threaded distal end of drive screw 112 is passed through hole (not shown) in U-mount 128. Crank rod 110 is passed through holes in U-mount 128.

Figure 17B:
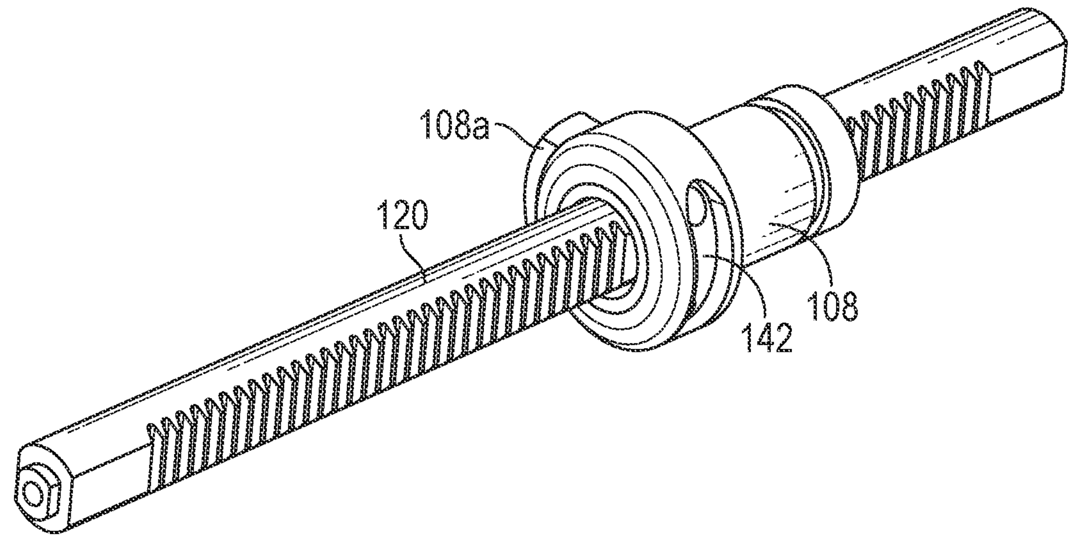
FIG. 17B illustrates a view of selected components of the actuation button assembly 108A.
Figure 18A:
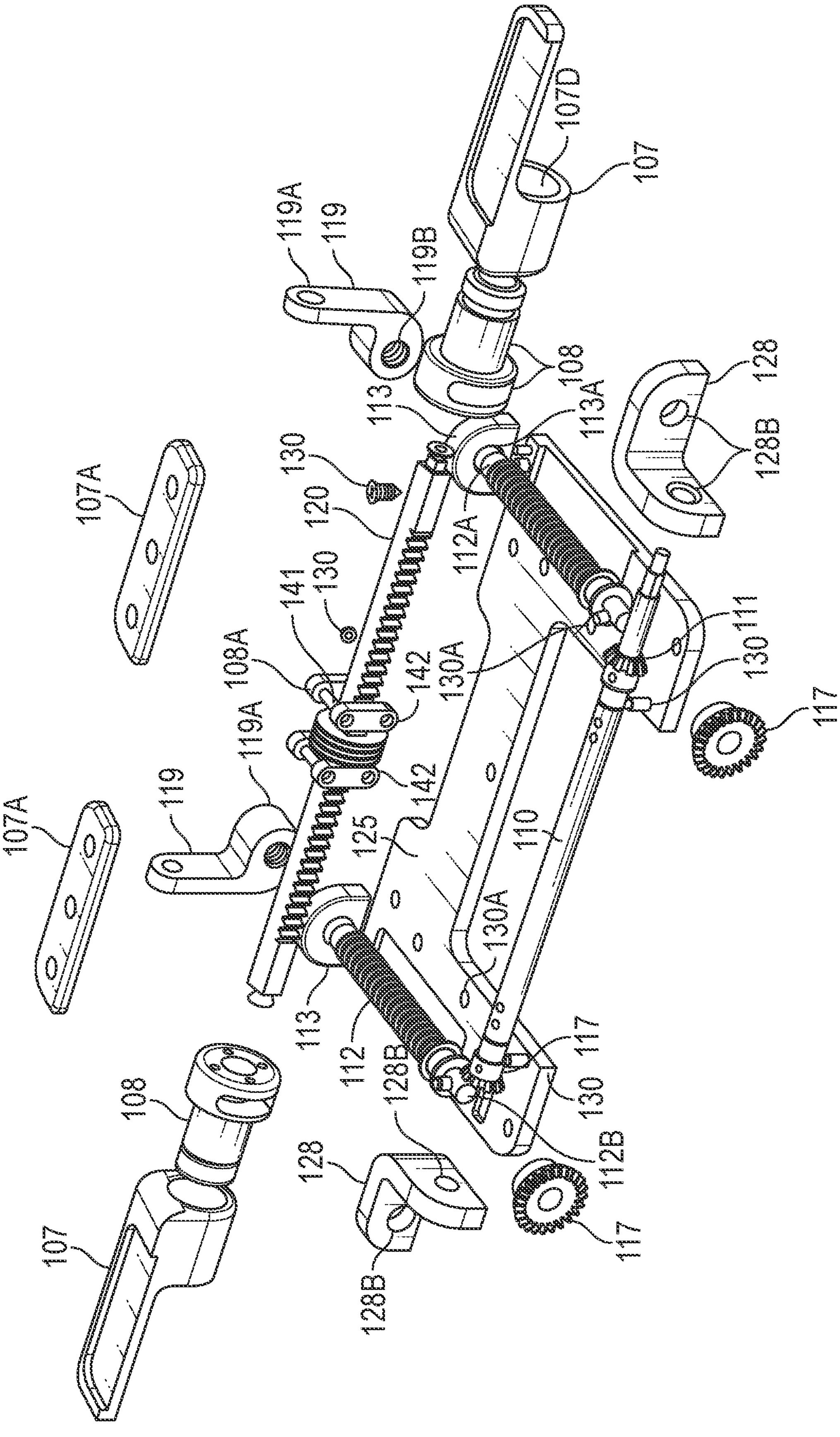
FIG. 18A illustrates an exploded view of some aspects of components of an embodiment of the positioning system.
Figure 18B:
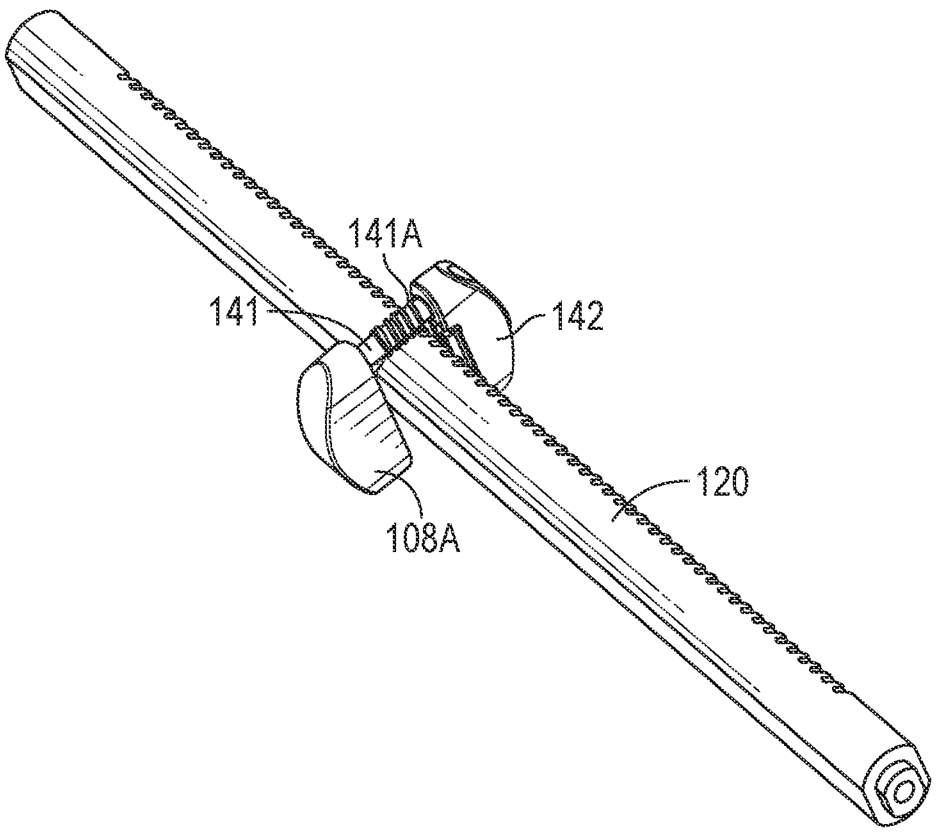
FIGS. 18B and 18C illustrate a detailed view of the spline rod 120 and lock bar 142.
Figure 18C:
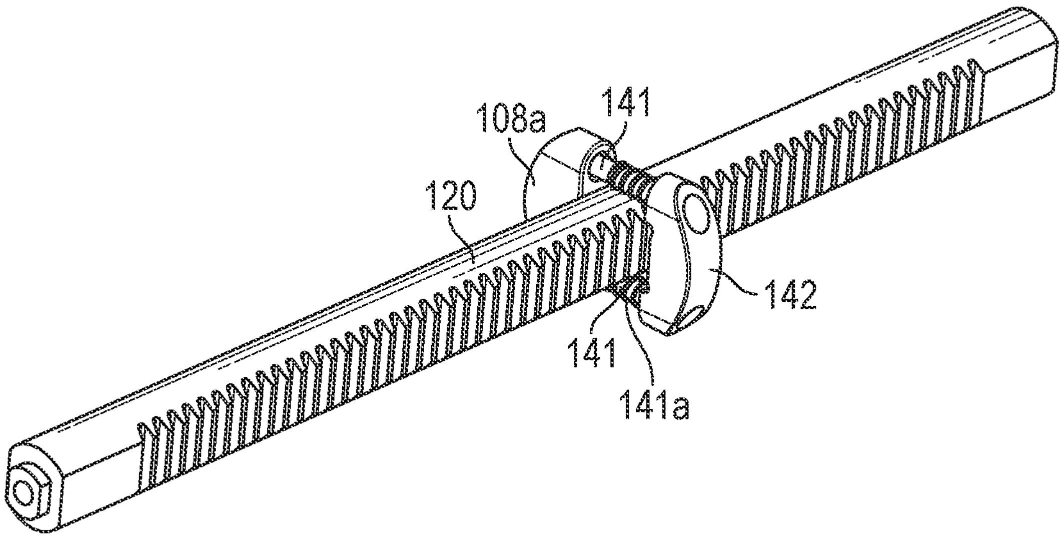

FIG. 17A illustrates a sectional view K-K from FIG. 5 of a portion of an embodiment of positioning system 100 with frame 100A. Actuator mount 108 has holes 108B formed in it. Actuation button assembly 108A includes rods 141 with biasing spring 141A with rod 141 passing through and out of proximal lock bar 142A with biasing spring 141A biasing rod 141 against lock bar 142 having lock tooth 142A. Lock tooth 142A, when biased by rods 141 fits into splines in splined rod, as shown in FIGS. 18A-18C. 120. Actuation button 108A1 can be fitted onto rods 141 which are engaged into holes 108B1 securing actuation button 108A1 to actuation button assembly 108A. Actuation mount 108 can be fitted onto and over actuation button assembly 108A, as shown in FIG. 17B. Pushing against actuation button 108A compresses biasing spring 141A releasing force against lock bar 142 and lock tooth 142A from engagement in splines (not shown) in splined rods 120 thereby allowing for the rotation of the actuation mount 108 about support rod 120. Lower bracket 150 attaches attachment strap 114 to lower surface of lower plate 125. Proximal end of flexible leaves 105 are fitted onto and sandwiched between mount block 107 and mount plate 107A. Lower plate 125 is attached to upper plate 126 by bolts 130 through matching holes (not shown). Crank rod 110 has crank rod gear Ill attached to it. Lower bracket 150 is attached to lower plate 125 by threaded bolts (not shown) in order to secure T-shaped end (not shown) of attachment strap 114 to positioning system 100. FIG. 17B illustrates the actuation button assembly 108A mounted on splined rod 120.

FIG. 18A illustrates a perspective exploded view of certain aspects of selected components of an embodiment of positioning system 100. Actuation button assembly 108A with holes can be fitted onto rods 141 biased against lock bar 142 which can be engaged onto it. Actuation button assembly 108A can be slid onto and engaged onto splined rod 120. Actuation mount 108 can be slid onto splined rod 120 and fitted onto and attached to actuation button assembly 108A. Mount block 107 with hole 107D can be attached to actuation mount 108 and may be slid onto splined rod 120. Mount plates 107A can be fixed to mount block 107 after the proximal end flexible leave (not shown) is slid onto top of mount block 107. Mount bracket 113 can be mounted onto upper platform 125. Non-threaded proximal end 112A of drive screw 112 can be inserted into hole 113A of mount bracket 113. Drive screw 112 can be engaged into threaded hole 119A of mount bracket 119. Crank rod 110 with attached crank rod gear 111 is shown. Screw drive gear 117 can be fitted onto non-threaded distal encl 112B of drive screw 112. U-mount 128 with holes 128B may be attached to upper platform 125 with non-threaded distal end 112B of drive screw 112 fitted into it while end of crank rod 110 may be passed into and through holes 128B. Through holes 130A are formed into upper platform 125 for mounting components and for attaching it to frame (not shown) and lower plate (not shown) using bolts 130 (examples shown).

Figure 19:
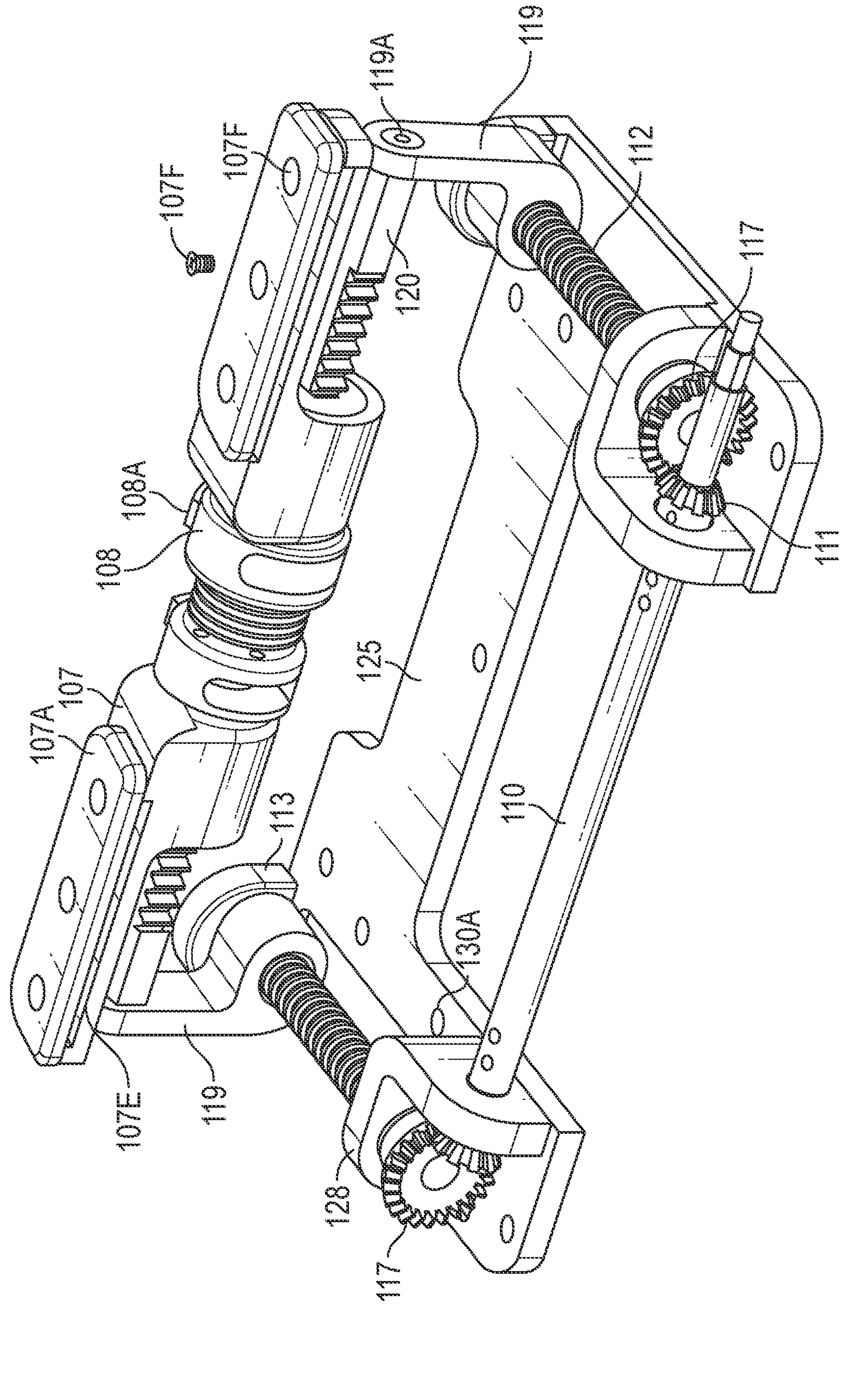
FIG. 19 illustrates a perspective view of some aspects of a subassembly of the components of FIG. 18A of an embodiment of the positioning system.
Figure 22:
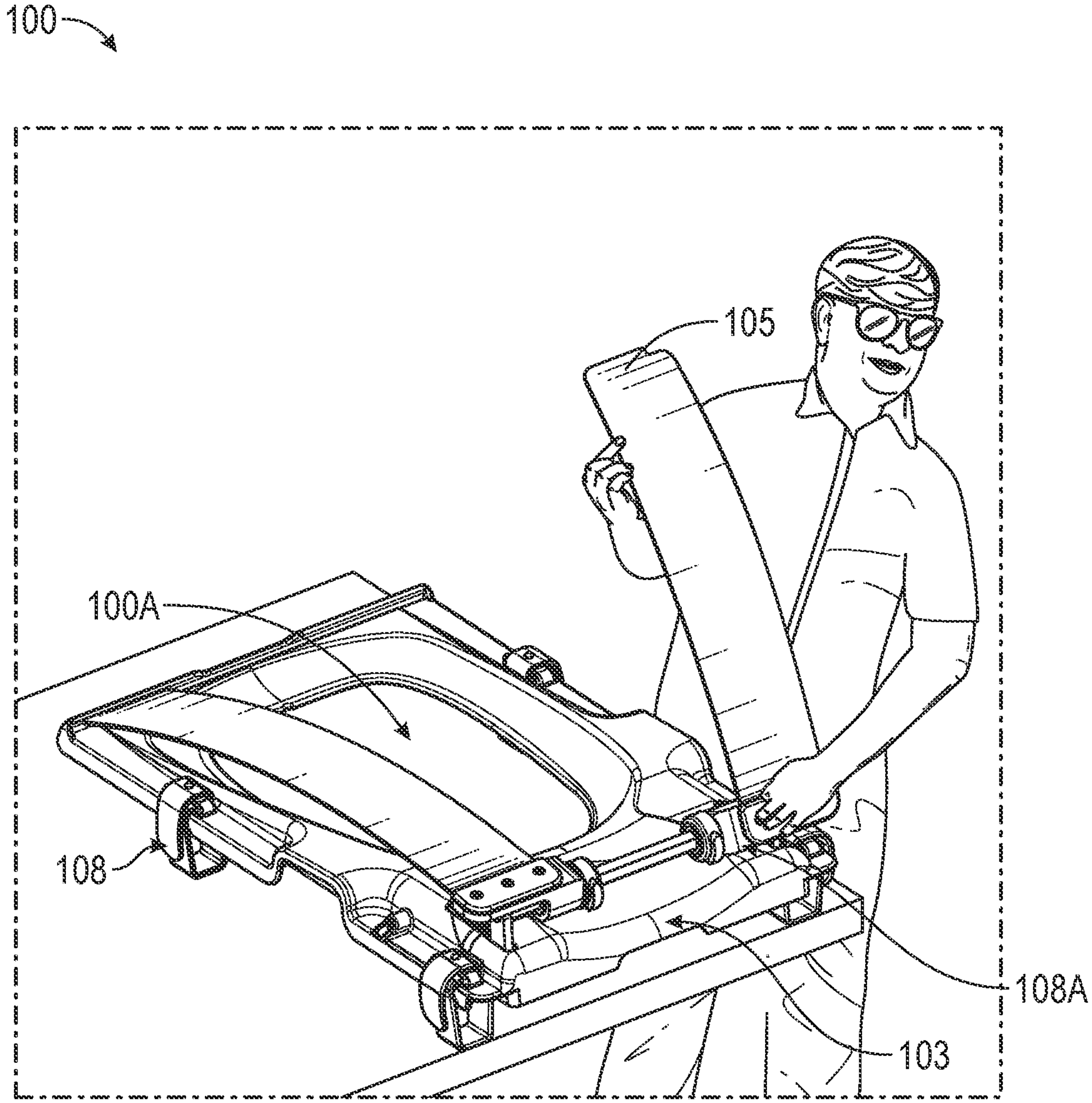
FIG. 22 provides a perspective view of some aspects of the proximal end of an embodiment of the positioning system.

FIG. 19 illustrates some aspects of certain assembled components of positioning system 100 including actuator mount 108 with actuator button assembly 108A, mount block 107 with mount plate 107 A and distal gap 107E between mount block 107 and mount plate 107 A sized to the approximate depth of the flexible leaves (not shown). Flat head screws 107F are used to secure mount plate 107A to mount block 107 after proximal end of flexible leaves (not shown) are in placed under mount plate 107A. Also shown is upper plate 125 with through holes 130A for mounting mount plate 125 to lower plate (not shown), splined rod mount 119 with holes 119A, mount bracket 113, drive screw 112 with drive gear 117 attached, crank rod 117 with crank rod gear 111 attached and splined rod 120. When flexible leaf 105 is rotated by pressing the actuation button 108A1, for example when it is rotated upwards towards proximal end 103 of frame 100A, as shown in FIG. 22, the actuation button assembly 108A and actuation button 108A1 do not rotate and maintain their rotational position relative to spline rod 120 and relative to frame 100A. This helps to minimize pinch hazards when rotating the flexible leaves 105 upward, as the actuation button 108A1 is maintained in a position above the frame 100A and does not rotate to a position below the spline rod 120 where a pinch hazard is increased. That is, when flexible leaf 105 is rotated, as shown in FIG. 22, only mount block 107 is rotated relative to the spline rod 120 while actuation button assembly 108A maintains its rotational position relative to spline rod 120 and relative to frame 100A.

Figure 20A:
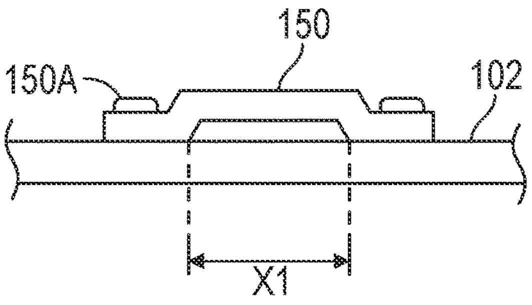
FIGS. 20A-20 E illustrate a perspective views of some aspects of one embodiment of the positioning system.
Figure 20B:
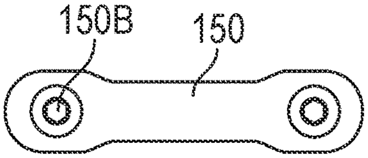
Figure 20C:
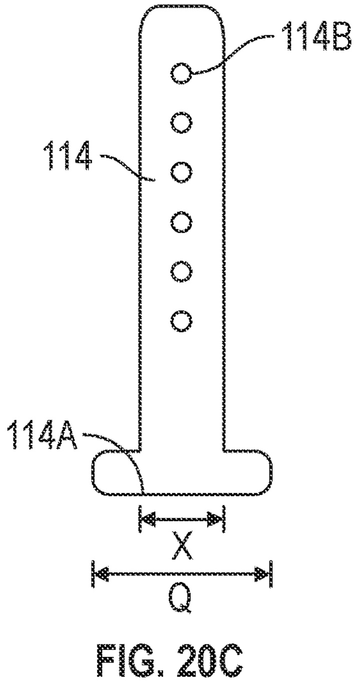
Figure 20D:
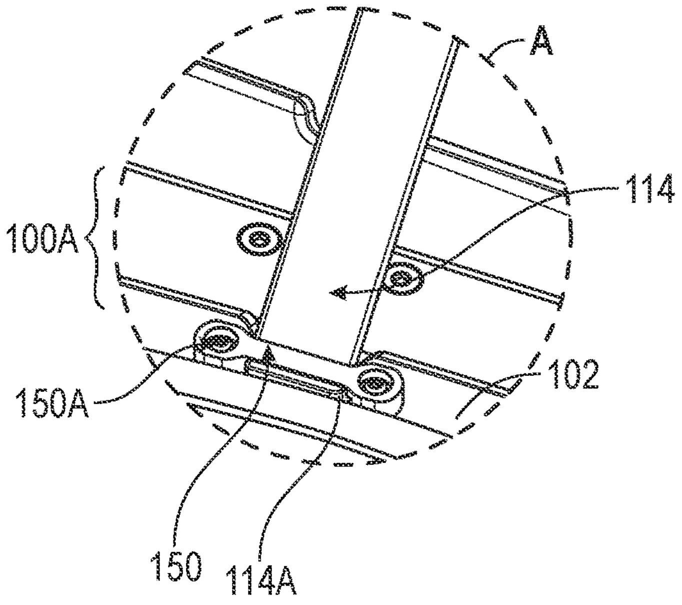
Figure 20E:
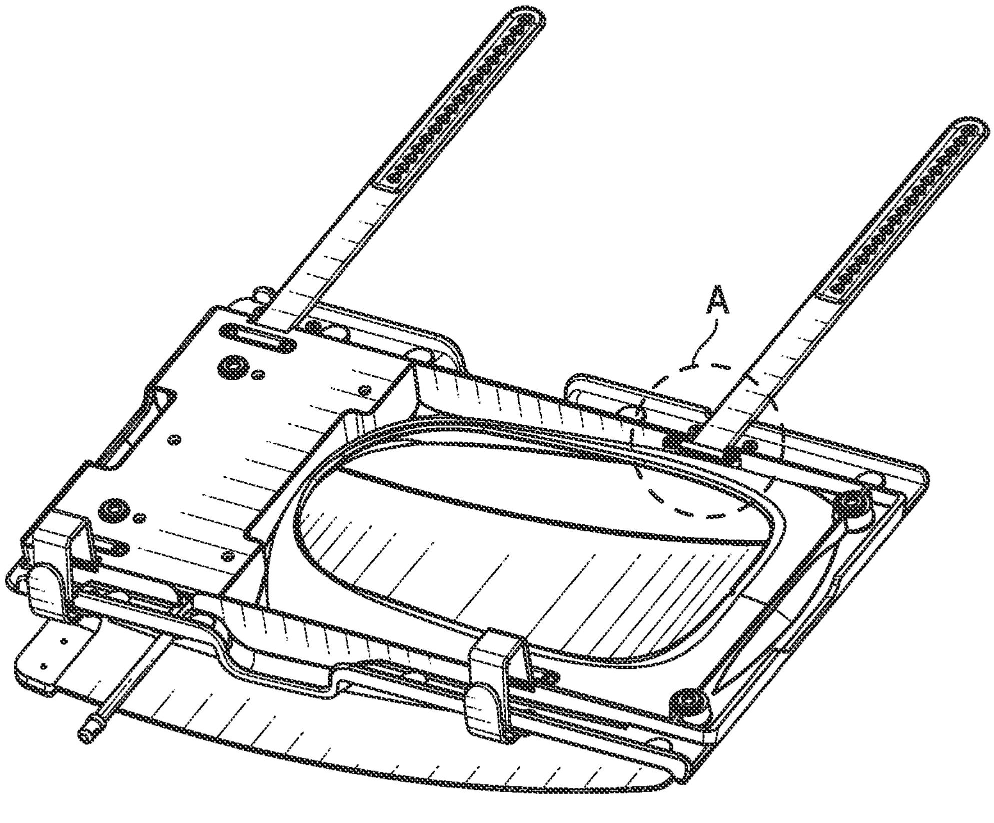

FIGS. 20A-20E illustrate some aspects of an embodiment of positioning system 100 near its distal end (not shown) with the lower surface of side 102 of frame 100A shown in FIG. 20D/E. Attachment strap 114 with holes 114B shown in FIG. 20C can be engaged with strap bracket standoff (not shown) on strap bracket (not shown) on upper surface of side 102 of frame 100A. "T" shape 114A is formed into one end of attachment strap 114 with holes 114B as shown in FIG. 20C. Lower bracket 150 with holes 150B is illustrated in FIG. 20B and further illustrated in FIG. 20A. More specifically, FIG. 20A illustrates lower bracket 150 with threaded bolts 150A engaged into holes (not shown) formed in lower surface of side 102 of frame 100A. Distance X1 in FIG. 20A can be between about 0.001 inches to about 0.009 inches greater than distance X in FIG. 20C while distance Q of FIG. 20C can be between about 0.15 inches to about 0.5 inches greater than distance X1 (FIG. 20A). 'T" shaped end 114A of attachment strap 114 can be fitted through to the medial side of lower bracket 150 while a portion of attachment strap 114 can be placed under lower bracket 150 before it is installed.

Threaded bolts 150A can be engaged into and through holes 150D in lower bracket 150 and engaged into holes (not shown) formed into the lower surface of side 102 of frame 100A securing attachment strap 114 to frame 100A.

Figure 21:
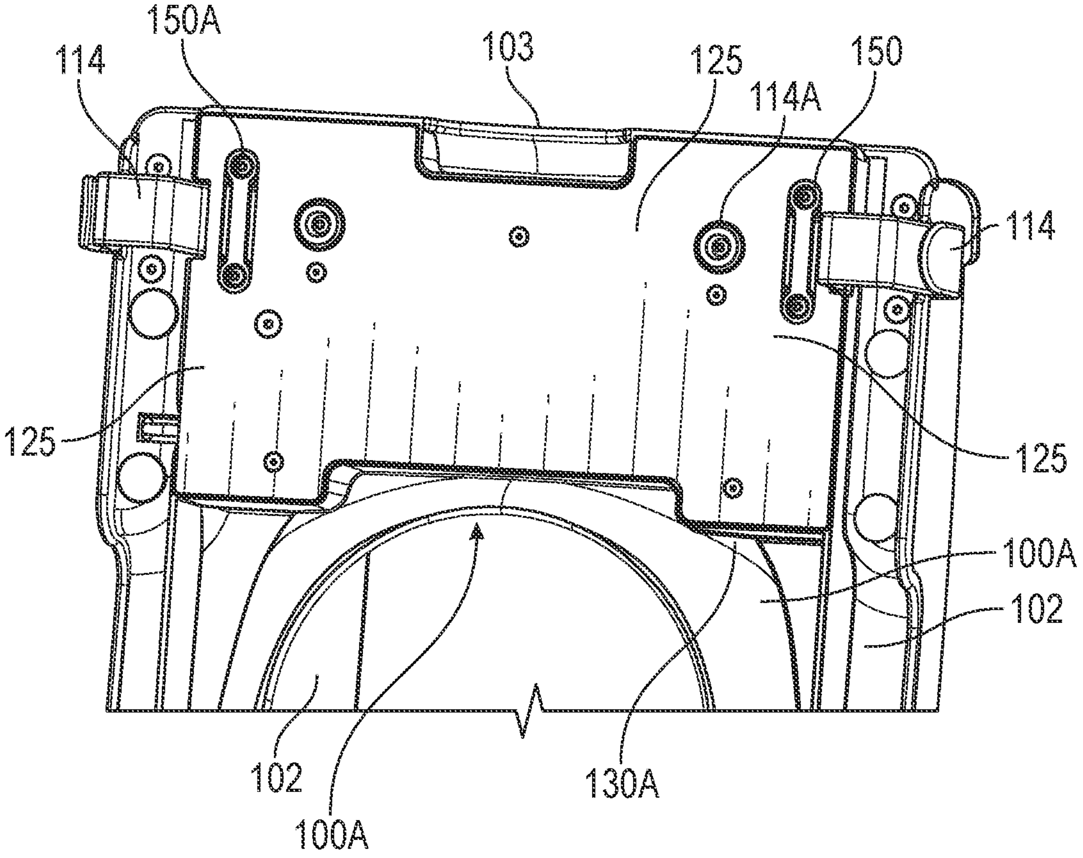
FIG. 21 includes a partial plan view of a portion of the lower surface of an embodiment of the positioning system.

FIG. 21 illustrates some aspects of a portion of an embodiment of positioning system 100 with proximal end 103. Strap bracket 150 is mounted onto bottom surface of side lower plate 125 which is attached by bolts 130A to lower surface of upper plate (not shown). T shaped distal end 114A of attachment strap 114 is fitted into distal edge of mount bracket 150 securing attachment strap 114 to lower plate 125.

FIG. 22 illustrates some aspects of a portion of an embodiment of positioning system 100 with frame 100A including flexible leaf 105 and actuation mount 108 with actuation button assembly 108A and actuation button 108A1. Flexible leaf 105 is rotated upwards towards proximal end 103 of frame 100A and almost perpendicular to the floor while actuation button 108A1 does not rotate but maintains its position relative to frame 100A. This helps to minimize pinch hazards when rotating the flexible leaves 105 upward, as the actuation button 108A1 is maintained in a position above the frame 100A and does not rotate to a position below spline rod 120 where a pinch hazard is increased, as described above. In other words, the rotation of the flexible leaves 105 does not cause a rotation of the actuation button 108A1.

Figure 23:
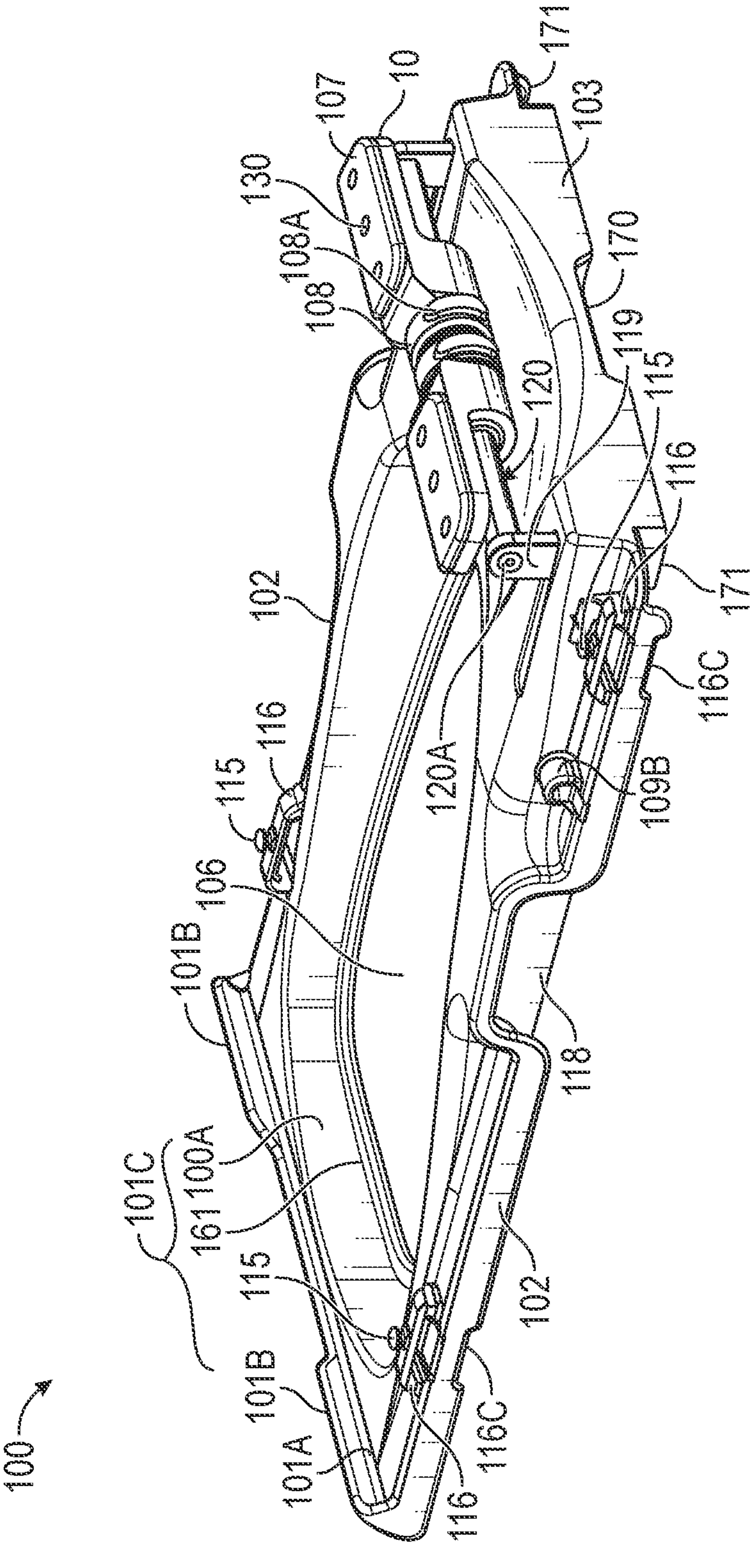
FIG. 23 provides a perspective view of some aspects of the proximal end of an embodiment of the positioning system.

FIG. 23 illustrates some aspects of an embodiment of positioning system 100 with frame 100A without flexible leaves (not shown) installed. Frame 100A has cutout 106 formed it in and has lateral sides 102, distal end 101 and proximal end 103. Frame 100A has distal end 101 with cut out 101C formed into it separating flanges 101B from one another. Cut out 101C can alleviate pressure on the patient's anatomy by preventing the patient from impinging on the distal end. Groove 101A, sized to accept flexible leaves (not shown), is formed in along the width of the proximal side of distal end 101 of frame 100A. Groove 100A runs the width of distal end 101. Strap bracket 116 with stand-off 115 on its upper surface is attached to upper surface of side 102 of frame 100A. Strap receiving cut-out 116C is formed in lower edge of side 102 of frame 101A. Handle 118 is formed in lower surface of side 102 of frame 100A. Handle 170 is formed into lower surface of proximal end 103 of frame 100A. Surgical table side rail grooves 171, sized to fit over and engage with surgical table side rails (not shown), are formed into the lower surface of sides 102 of frame 100A and run the length of sides 102. Mount plates 107A are attached to mount block 107 by bolts 130. Actuation mount 108 with actuation button assembly 108A is attached to mount block 107. Splined rod 120 is mounted to spline rod mount 119. Splined rod 120, which is engaged in through holes in mount block 107 and actuation mount 108 with actuation button assembly 108A are attached to spline rod mount 119 by flat head screw 120A.

Figure 24:
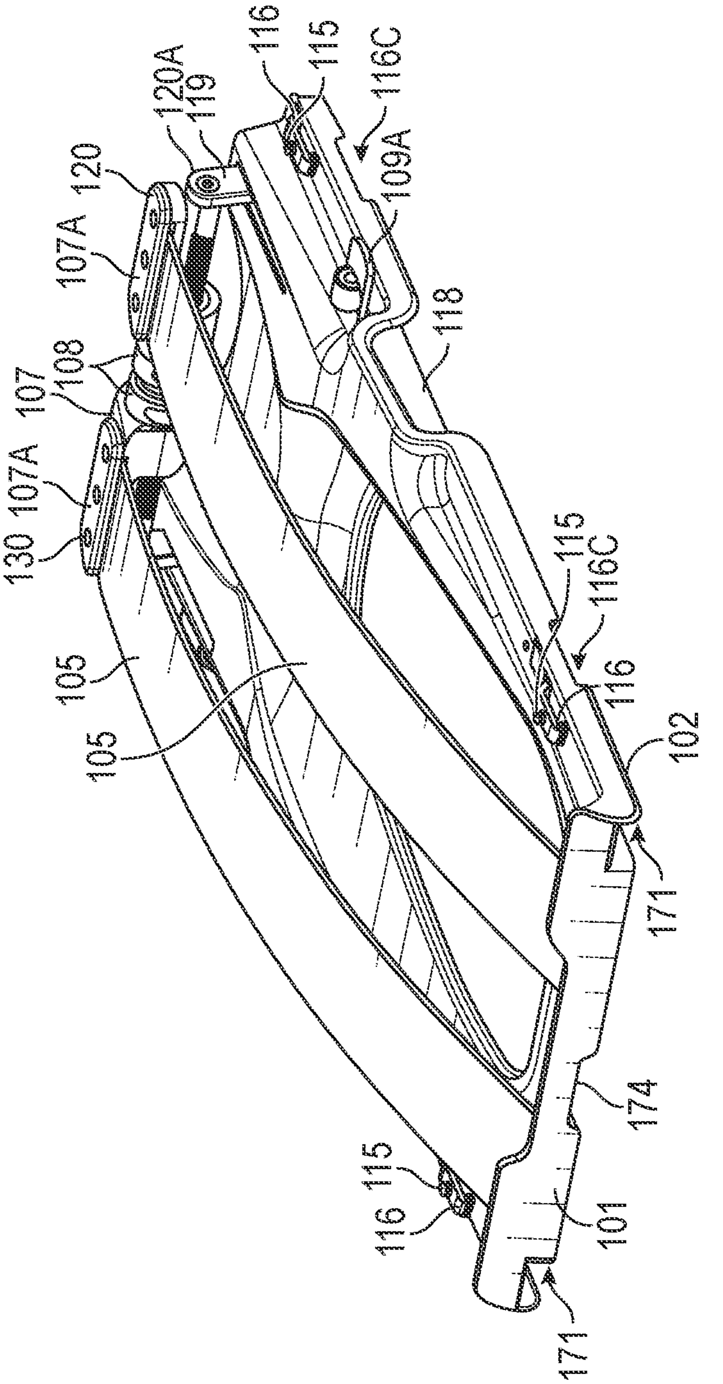
FIG. 24 provides a perspective view of some aspects of the distal end of an embodiment of the positioning system.

FIG. 24 illustrates some aspects of an embodiment of positioning system 100 with frame 100A with flexible leaves 105 installed. Distal end 101 has handle 174 formed in the center of its lower edge. Strap bracket 116 with stand-off 115 is attached to upper surface of side 102 of frame 100A. Strap receiving cut-out 116C is formed in lower edge of side 102 of frame 100A. Handle 118 is formed in lower surface of side 102 of frame 100A. Surgical table side rail grooves 171 can be formed into lower surface of distal end 101 of frame 100A. Surgical table side rail grooves 171 are sized to fit over and engage with surgical table side rails (not shown) and run the length of sides 102. Flexible leaves 105 fit in between mount plates 107A which is attached to mount block 107 by bolts 130 in holes (not shown) in mount plate 107A. Actuation mount 108 with actuation button 108A is attached to mount block 107. Splined rod 120 can b e mounted to spline rod mount 119 by flat head threaded screw 120A. Mount block 107, actuation mount 108 with actuation button assembly 108A are mounted onto splined rod 120.

Figure 25A:
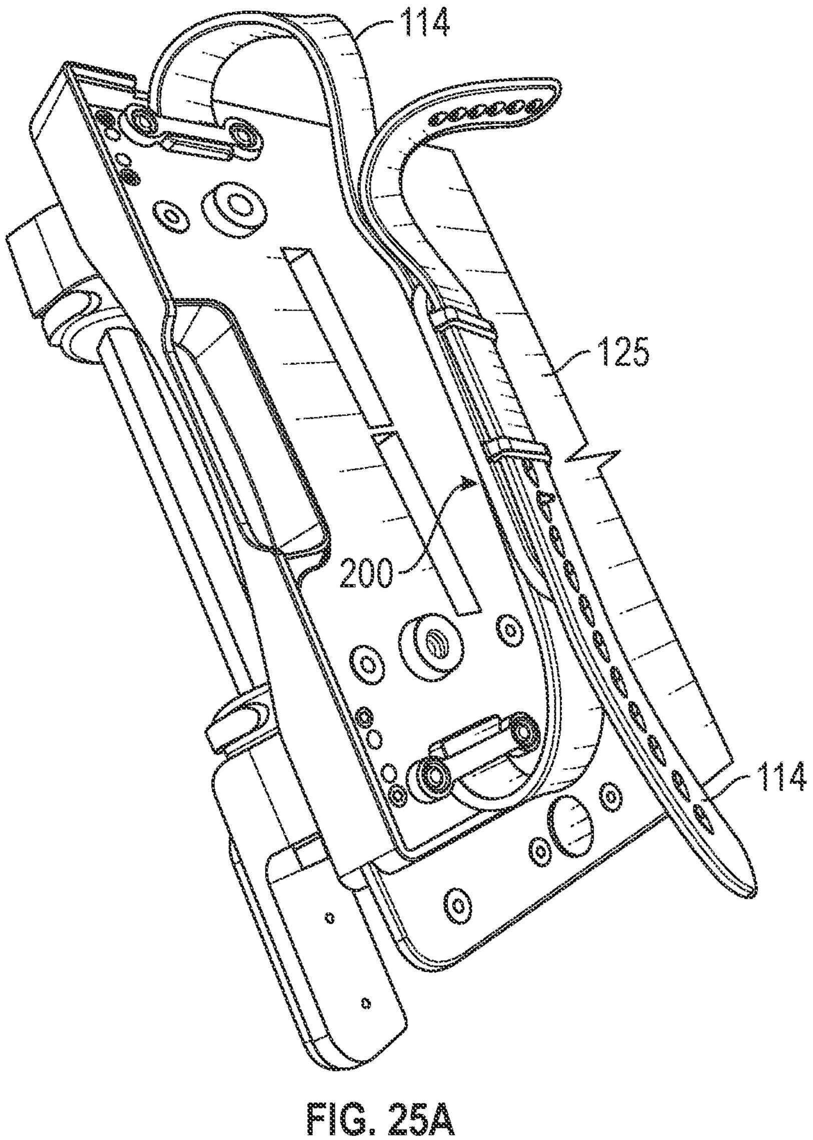
FIGS. 25A-25D show the strap buckle.
Figure 25B:
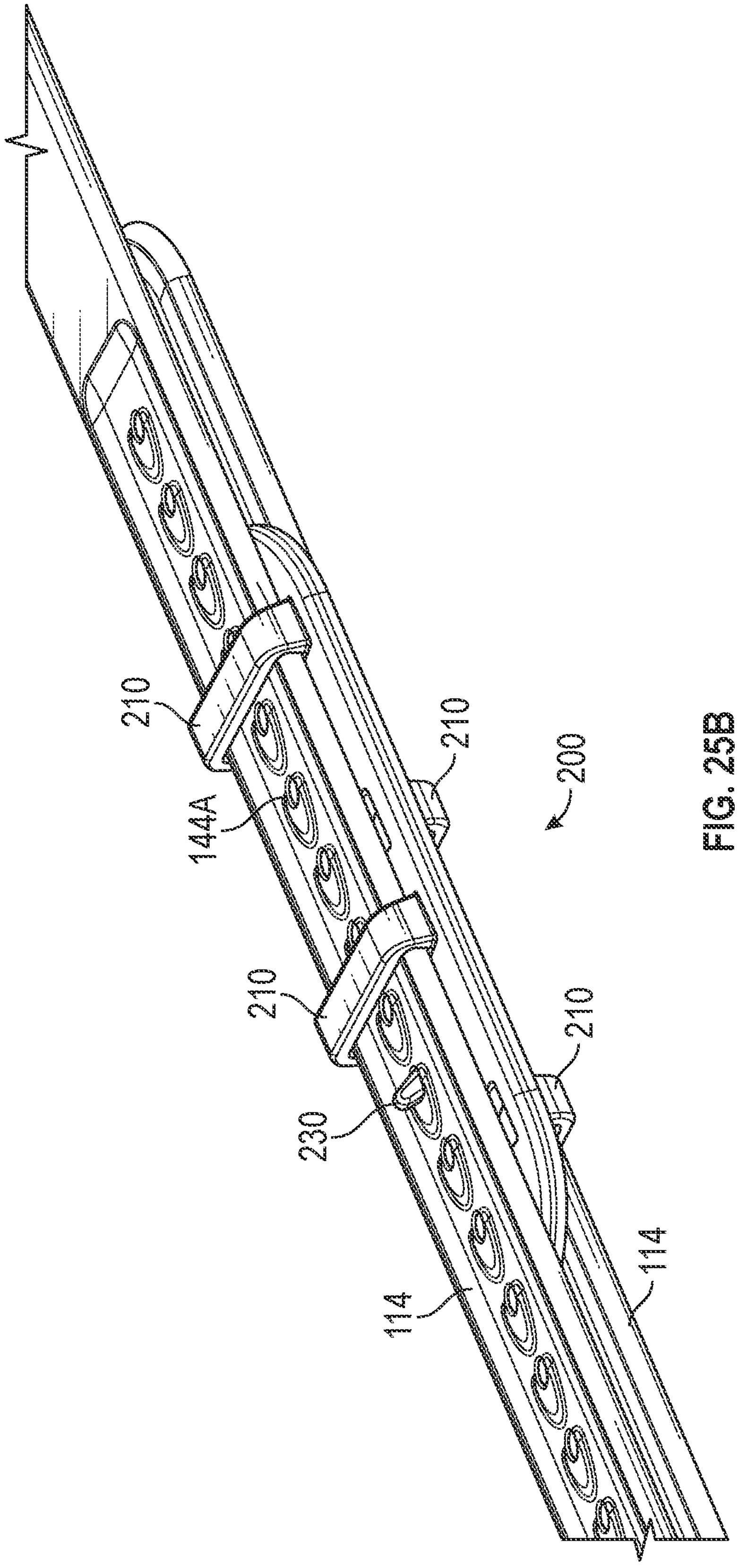
Figure 25C:
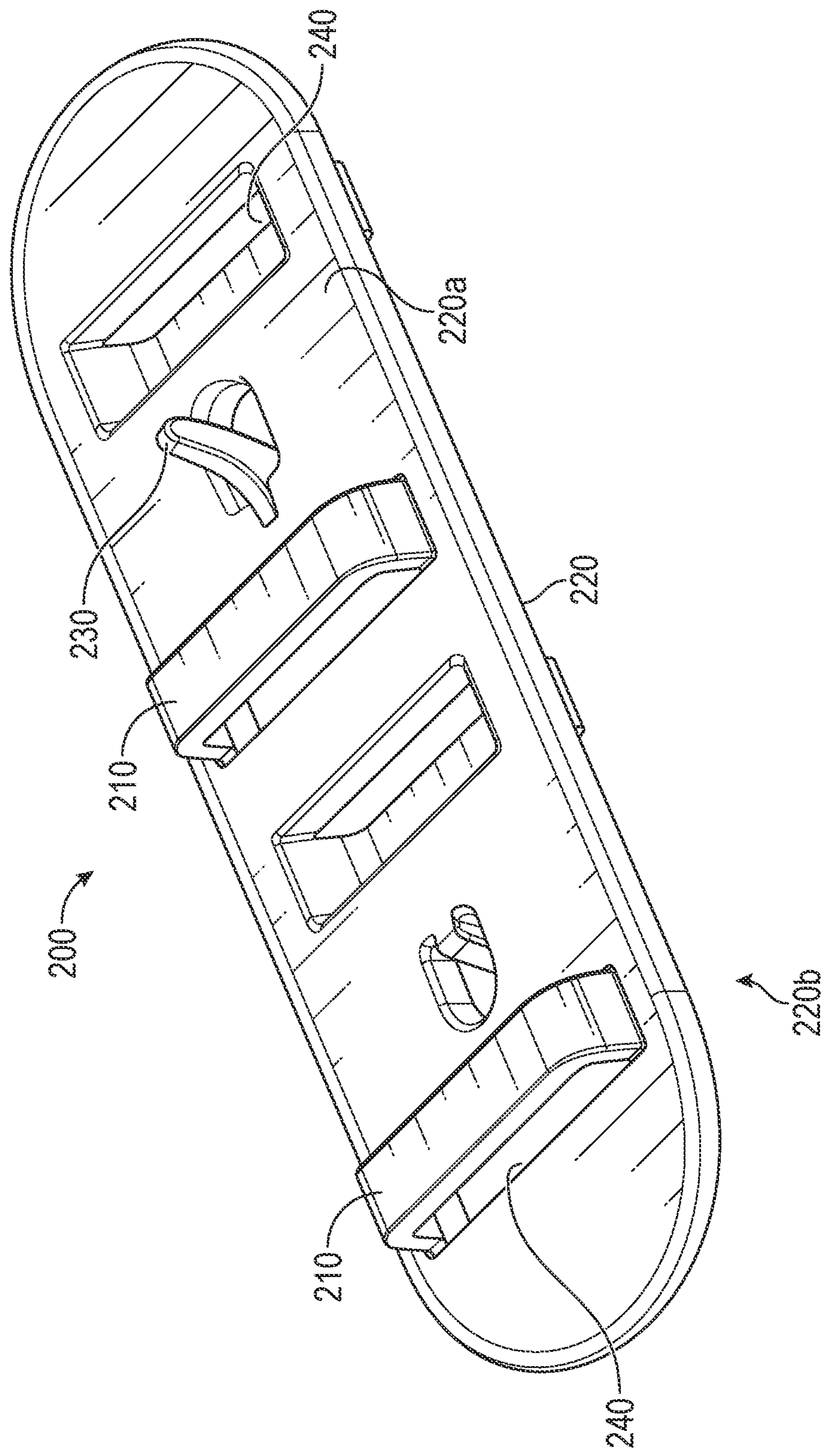
Figure 25D:
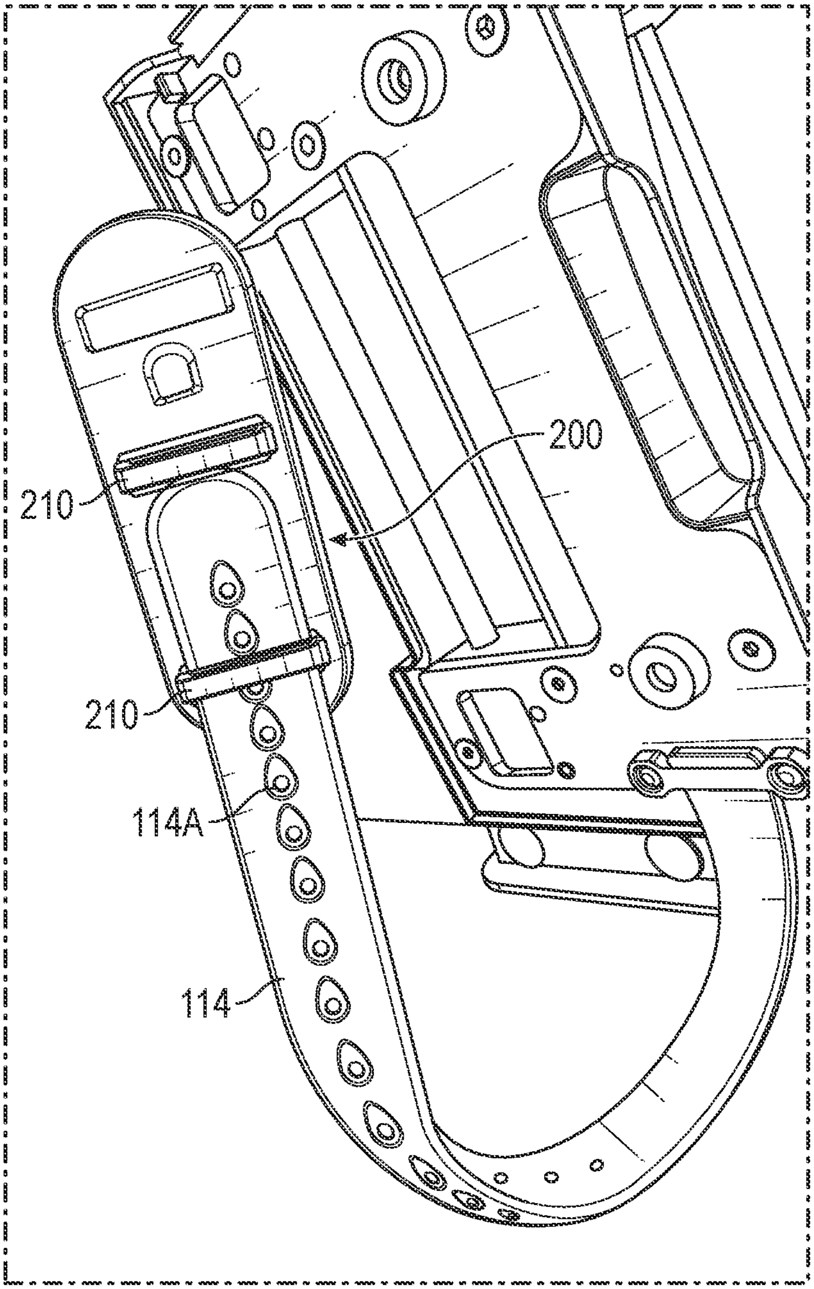

FIGS. 25A-25D show strap buckle 200 that can be used with the aforementioned straps 114 in order to directly attach the frame 100A to a surgical table. As described above, the straps can be looped around the accessory attachment rail of a surgical table and then secured at their other end to an attachment point on the attachment straps 114. As shown in FIGS. 25A and 25B, the straps 114 also can used to attach the frame 100A to a standard table without rail attachments (i.e., a flat top table, imaging top table, etc.) by wrapping each strap 114 around the table and then attaching and tightening the straps together using the strap buckle 200. As shown in FIG. 25C, the strap buckle 200 comprises a body 220 having two opposed sides 220*a* and 220*b*. Each opposed side comprises a substantially flat surface for engaging and supporting one of the straps 114. Each end of the straps 114 can be inserted into strap holders 210 formed on the opposed sides 220*a* and 220*b* of the body 220 of the strap buckle 200, as shown in FIG. 25D. As shown in FIGS. 25B and 25C, each strap holder 210 provides a substantially rectangular opening through which the strap 114 can pass. Although FIGS. 25B and 25C show two strap holders on each opposed side, one, or more than two, strap holders could be formed on each of the opposed sides. As shown in FIGS. 25B and 25C, protrusions 230 are formed on each of the opposed sides, each protrusion 230 being configured to extend from a respective opposed side and engage with holes 114B in the strap 114 so as to secure the strap to the respective opposed side of the body 220. Each of the protrusions 230 can be tilted relative to the flat surface of the respective opposed side at an acute angle, as shown in FIG. 25C. This acute angle formed between each of the protrusions and the respective flat surface can be in a range of about 33 degrees to about 89 degrees. Alternatively, the protrusions can be curve-shaped so that they extend away from the flat surface of the opposed sides in a curve having a radius of curvature in a range of approximately 20 mm to 100 mm. The protrusions can be configured to extend away from the flat surface of the opposed sides to a height greater than a height of the strap holders. Cutouts 240 can be formed in the opposed sides 220*a* and 220*b* in areas opposite to the strap holders, as shown in FIG. 25C.

Although certain illustrative embodiments are described in detail above, many embodiments, variations and modifications are possible that would be within the scope and spirit of this disclosure as described herein and as defined in the claims that follow. The disclosure herein should not, therefore, be limited to any particular embodiment disclosed herein, and should be given full scope of the appended claims.

What is claimed is:

1. A patient support system for supporting a patient during surgery comprising a support frame;

a plurality of patient supports;

a moveable carriage mounted to the support frame, the moveable carriage being movable along a first direction and a second direction relative to the support frame, the moveable carriage comprising mount blocks on which the patient supports are mounted and comprising a support rod, the mount blocks being movable along the support rod to adjust a distance between the patient supports; and an actuation mechanism that causes movement of the moveable carriage in the first and second directions, said patient supports removably attached at one end to the support frame and attached at another end to the movable carriage, wherein the mount blocks are rotatable independent of any movement of the movable carriage in the first and second directions and wherein the mount blocks are rotationally supported on the support rod, and the moveable carriage further comprises actuation mounts corresponding to each of the mount blocks and supported on the support rod, wherein when a mount block is rotated relative to the support rod, the actuation mounts do not rotate relative to the support rod.

2. The patient support system of claim 1, wherein the support rod has splines covering less than fifty percent of a circumferential surface of said splined support rod.

3. The patient support system of claim 1, wherein the support rod is mounted to the actuation mechanism.

4. The patient support system of claim 1, wherein each of the actuation mounts comprise an actuation button assembly and an actuation button, wherein when a mount block is rotated relative to the support rod by actuating the actuation button, the actuation button assembly and actuation button do not rotate relative to support rod and relative to the frame.

5. The patient support system of claim 1, wherein the frame has a cutout in a center portion thereof of a size equal to at least 80% of a total upper surface area of said frame.

6. The patient support system of claim 1, wherein said patient supports comprise a padded flexible member.

7. The patient support system of claim 1, wherein the frame has a handle formed into its lateral, distal and proximal sides.

8. The patient support system of claim 1, wherein the frame comprises channels formed into its lateral sides sized to accept accessory rails of a medical bed or surgical table.

9. The patient support system of claim 1, wherein the frame comprises at least one handle formed into each of its lateral sides.

10. The patient support system of claim 1, wherein the frame comprises at least one handle formed into each of its ends.

11. The patient support system of claim 1, wherein the support rod is mounted to a splined rod mount that is movable in the longitudinal direction along a drive screw by the actuation mechanism.

12. The patient support system of claim 11, wherein the actuation mechanism comprises a crank rod that drives the drive screw.

13. The patient support system of claim 12, wherein the crank rod is made of a material with radiolucent properties selected from the group comprising aluminum and carbon fiber.

14. The patient support system of claim 12, wherein the crank rod is configured to be driven by a crank handle.

15. A patient support system for supporting a patient during surgery comprising:

a support frame; and a plurality of patient supports removably attached to the support frame, wherein the support frame is removably attachable to a surgical table by a flexible waterproof strap that passes around a surgical rail on the surgical table, wherein the waterproof strap is connected at one end to the support frame and removably attached to the support frame at its other end and wherein the waterproof band or strap has holes formed therein; and at least two strap brackets each having a stand-off mounted to an upper surface of the support frame such that the strap can be looped around a surgical table side rail and looped over and through the strap bracket and attached to stand off.

16. The patient support system of claim 15, wherein portions of the strap surrounding said holes have increased thickness.

17. The patient support system of claim 15, wherein the holes are sized to fit the stand-off.

18. A patient support system for supporting a patient during surgery, comprising a support frame; and a plurality of patient supports, wherein the patient supports comprise leaves that include a notch portion on an outside section thereof thereby allowing the leaves to extend in a width direction beyond the frame, wherein the notch portions reduce a length of a respective leave at an outside portion thereof.

19. The patient support system of claim 18, wherein the notch portions have a dimension in the width direction of between one inch and four inches.

20. The patient support system of claim 18, wherein the frame is a one piece unibody frame.

21. The patient support system of claim 20, wherein the frame is formed from materials selected from the group comprising glass filled polycarbonate, carbon fiber, mixture of glass filled polycarbonate and carbon fiber.

22. A patient support system for supporting a patient during surgery comprising:

a support frame;

a plurality of patient supports;

a moveable carriage mounted to the support frame, the moveable carriage being movable along a first direction and a second direction relative to the support frame, the moveable carriage comprising mount blocks on which the patient supports are mounted; and an actuation mechanism that causes movement of the moveable carriage in the first and second directions, said patient supports removably attached at one end to the support frame and attached at another end to the movable carriage, wherein the mount blocks are rotatable independent of any movement of the movable carriage in the first and second directions, wherein the moveable carriage comprises a support rod, the mount blocks being movable along the support rod to adjust a distance between the patient supports, wherein the mount blocks are rotationally supported on the support rod, and the moveable carriage further comprises actuation mounts corresponding to each of the mount blocks and supported on the support rod, wherein when a mount block is rotated relative to the support rod, the actuation mounts do not rotate relative to the support, and wherein each of the actuation mounts comprise an actuation button assembly and an actuation button, wherein when a mount block is rotated relative to the support rod by actuating the actuation button, the actuation button assembly and actuation button do not rotate relative to support rod and relative to the frame.

* * * * *